United States Patent
Sazawa et al.

(10) Patent No.: US 9,866,351 B2
(45) Date of Patent: Jan. 9, 2018

(54) COMMUNICATION METHOD AND COMMUNICATION APPARATUS

(71) Applicant: FUJITSU LIMITED, Kawasaki-shi, Kanagawa (JP)

(72) Inventors: Shinichi Sazawa, Atsugi (JP); Yuichi Sato, Yamato (JP); Hiroaki Kameyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 289 days.

(21) Appl. No.: 14/822,220

(22) Filed: Aug. 10, 2015

(65) Prior Publication Data

US 2015/0349930 A1 Dec. 3, 2015

Related U.S. Application Data

(63) Continuation of application No. PCT/JP2013/057920, filed on Mar. 20, 2013.

(51) Int. Cl.
*H04L 1/18* (2006.01)
*H04L 12/741* (2013.01)
(Continued)

(52) U.S. Cl.
CPC .......... *H04L 1/1819* (2013.01); *H04L 1/0009* (2013.01); *H04L 43/0864* (2013.01);
(Continued)

(58) Field of Classification Search
CPC . H04L 1/0009; H04L 1/1819; H04L 41/0896; H04L 43/062; H04L 43/0841;
(Continued)

(56) References Cited

U.S. PATENT DOCUMENTS

2003/0126238 A1  7/2003  Kohno et al.
2008/0134005 A1*  6/2008  Izzat ............... H04L 1/0009
                                                  714/774

(Continued)

FOREIGN PATENT DOCUMENTS

JP  2002-507369  3/2002
JP  2010-98766  4/2010

(Continued)

OTHER PUBLICATIONS

International Search Report dated May 7, 2013 in corresponding international application PCT/JP2013/057920.

(Continued)

*Primary Examiner* — Mounir Moutaouakil
(74) *Attorney, Agent, or Firm* — Staas & Halsey LLP

(57) ABSTRACT

A network includes first through third communication apparatuses. The second communication apparatus identifies, from packets received from the first communication apparatus, forwarding packets that are packets to be transmitted to the third communication apparatus, and measures the interval in receiving the forwarding packets. The second communication apparatus forwards the forwarding packets to the third communication apparatus. The second communication apparatus receives report information that reports the reception state of forwarding packets from the third communication apparatus, and uses the report information to select target packets that are packets for which success of reception has not been reported from the third communication apparatus in the packets that were forwarded to the third communication apparatus. When the interval in receiving forwarding packets from the first communication apparatus exceeds a threshold, the second communication apparatus retransmits the target packets to the third communication apparatus in a format available for error correction.

11 Claims, 17 Drawing Sheets

(51) Int. Cl.
*H04L 12/721* (2013.01)
*H04L 12/703* (2013.01)
*H04L 1/00* (2006.01)
*H04L 12/26* (2006.01)

(52) U.S. Cl.
CPC .............. *H04L 43/16* (2013.01); *H04L 45/28* (2013.01); *H04L 45/70* (2013.01); *H04L 45/74* (2013.01); *H04L 43/0841* (2013.01)

(58) Field of Classification Search
CPC ..... H04L 43/0864; H04L 43/16; H04L 45/28; H04L 45/70; H04L 45/74
See application file for complete search history.

(56) References Cited

U.S. PATENT DOCUMENTS

| | | |
|---|---|---|
| 2008/0137689 A1 | 6/2008 | Shiizaki et al. |
| 2008/0148329 A1* | 6/2008 | Costa .................... H04L 1/0009 725/109 |
| 2009/0177938 A1* | 7/2009 | Pons ..................... H04L 1/0019 714/751 |
| 2009/0310493 A1 | 12/2009 | Nogami |
| 2010/0322143 A1* | 12/2010 | Cai ........................... H04L 1/16 370/315 |
| 2011/0243217 A1* | 10/2011 | Sanjeewa ........... H04N 21/2404 375/240.01 |
| 2011/0314351 A1 | 12/2011 | Tada et al. |
| 2012/0105637 A1* | 5/2012 | Yousefi .................. H04N 7/183 348/148 |
| 2013/0028213 A1* | 1/2013 | Ko ....................... H04B 7/0623 370/329 |
| 2014/0022982 A1* | 1/2014 | Kim ..................... H04L 1/0077 370/315 |
| 2015/0029952 A1* | 1/2015 | Huang ................. H04L 1/0003 370/329 |
| 2015/0117300 A1* | 4/2015 | Nam ..................... H04L 1/1819 370/315 |

FOREIGN PATENT DOCUMENTS

| | | |
|---|---|---|
| JP | 2012-4952 | 1/2012 |
| WO | 2007/007383 A1 | 1/2007 |
| WO | 2007/061087 A1 | 5/2007 |

OTHER PUBLICATIONS

Extended European Search Report for Application No. 13878896.3-1851 dated Apr. 4, 2016.

\* cited by examiner

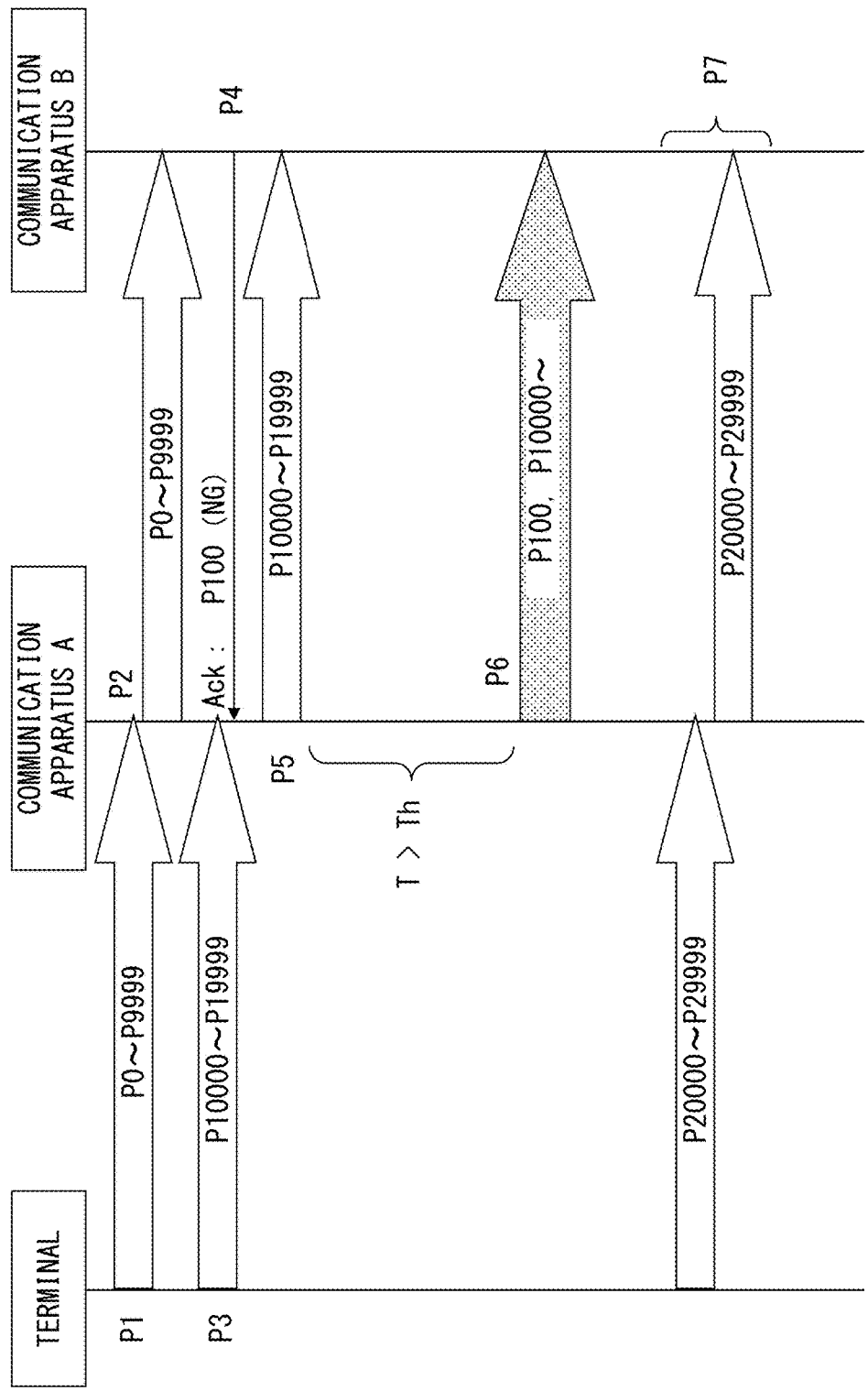
F I G. 1

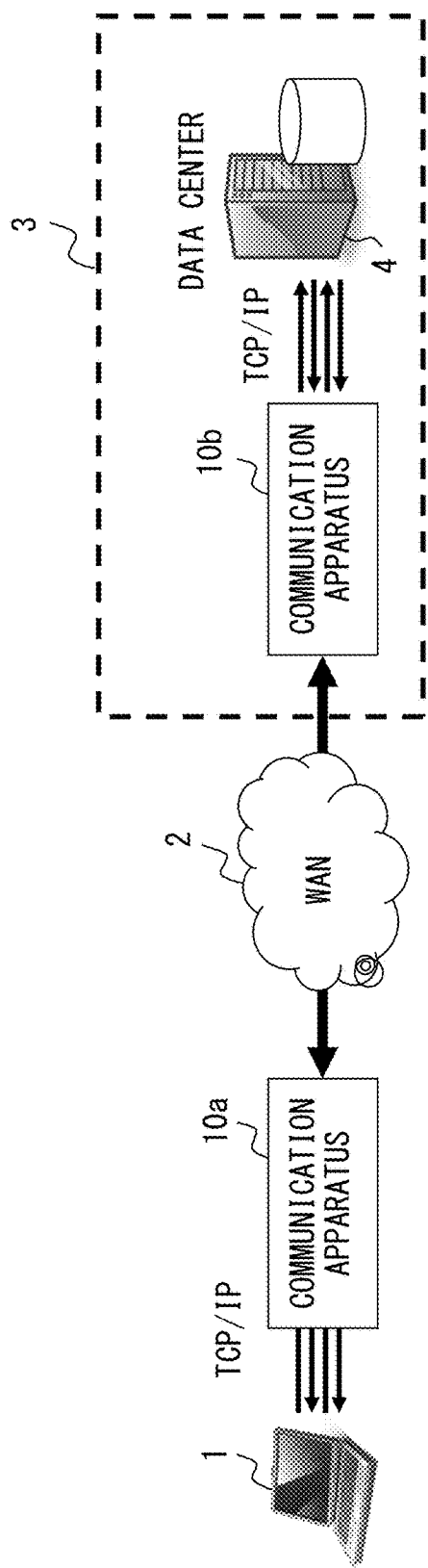
F I G. 2

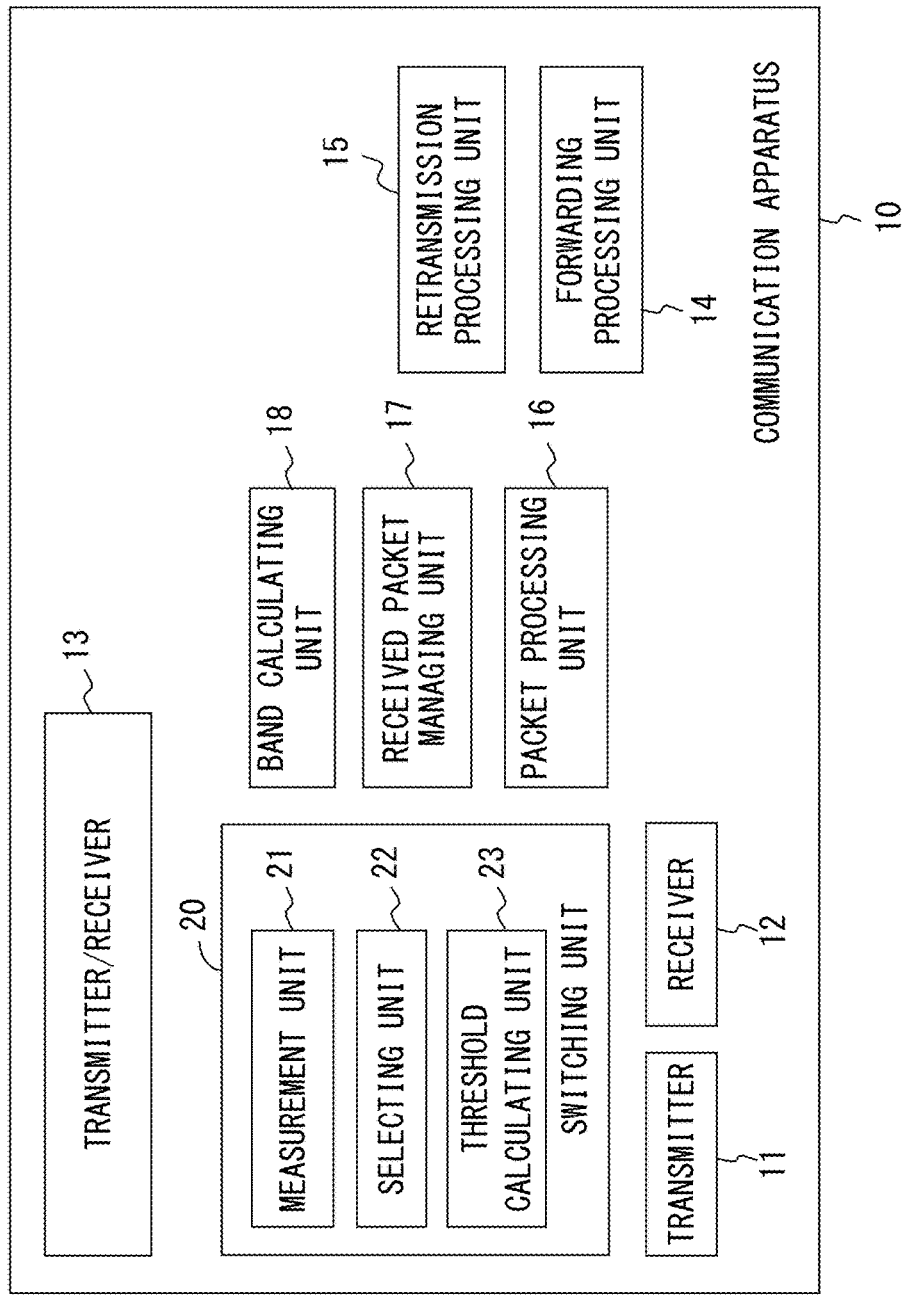
F I G. 3

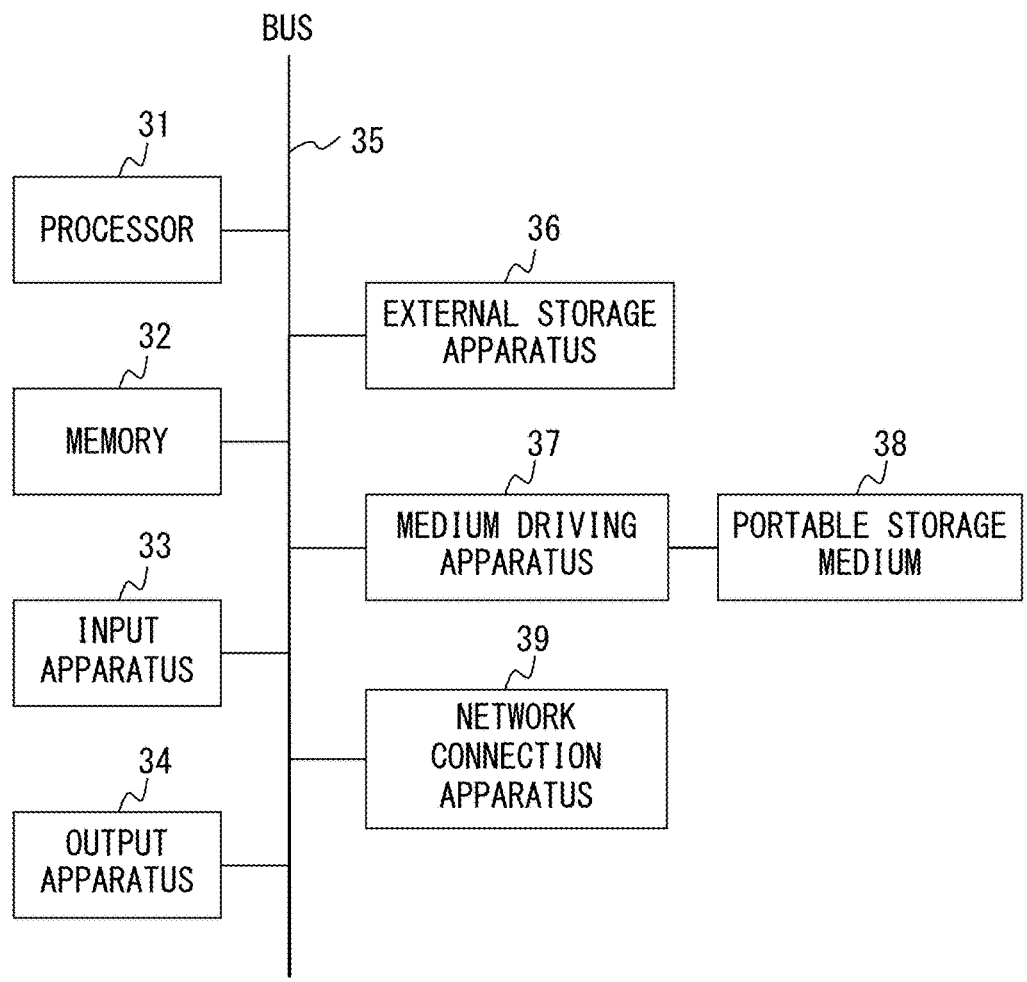
F I G. 4

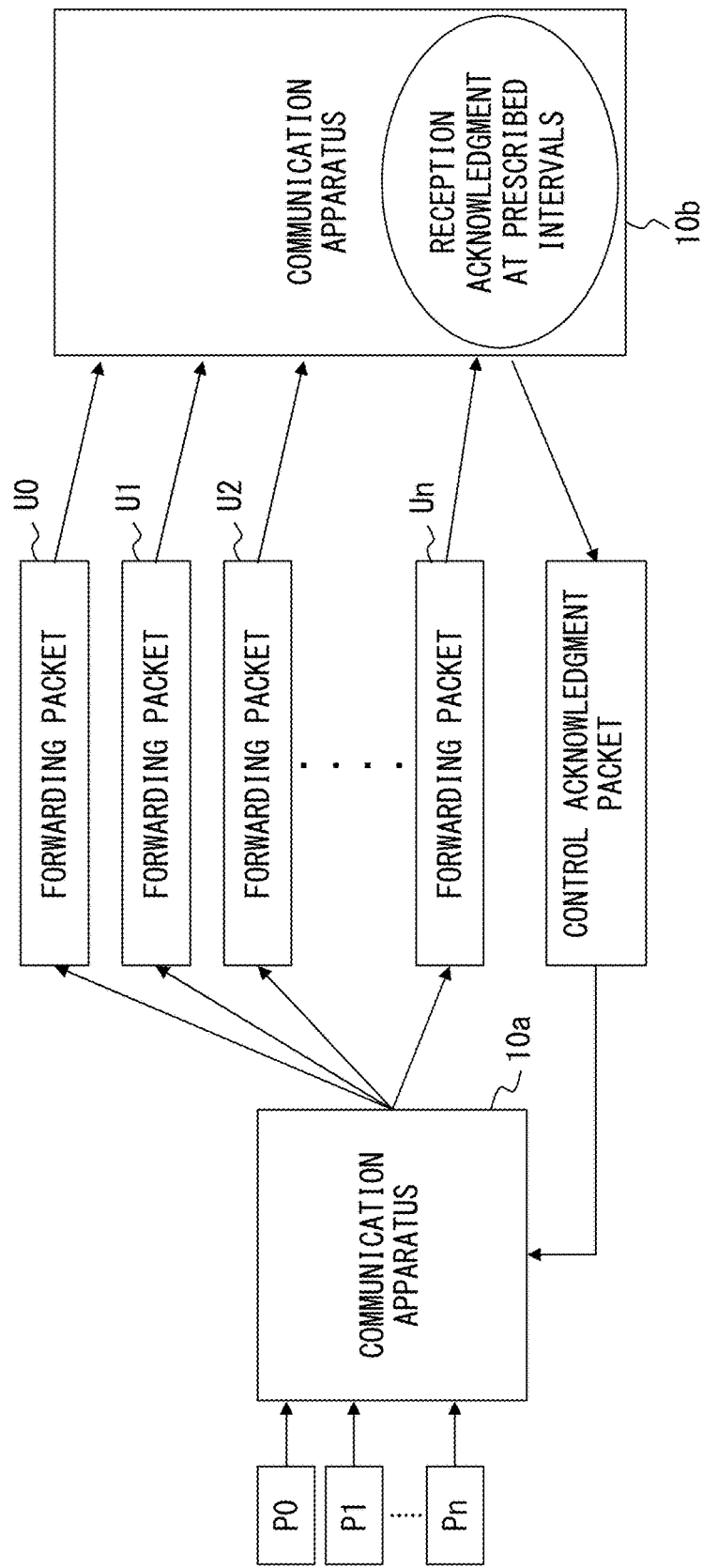
F I G. 9

| payload size = U | control information identifier | received size(8019 * U) | maximum received size(10000 * U) | reception band | acknowledgment request presence/absence | retransmission start ID (8020) | retransmission start sequence length (4[=8024-8020]) | retransmission start ID (8700) | retransmission start sequence length (1) | retransmission start ID (9010) | retransmission start sequence length (11) |
|---|---|---|---|---|---|---|---|---|---|---|---|

FIG. 10

| TRANSMITTING | PACKET8020 |
|---|---|
| TRANSMITTING | PACKET8021 |
| TRANSMITTING | PACKET8022 |
| TRANSMITTING | PACKET8023 |
| TRANSMITTING | PACKET8700 |
| TRANSMITTING | PACKET9010 |
| TRANSMITTING | PACKET9011 |

⋮

| TRANSMITTING | PACKET9020 |
|---|---|
| TRANSMITTING | PACKET9021 |
| TRANSMITTING | PACKET10001 |
| TRANSMITTING | PACKET10002 |

⋮

| TRANSMITTING | PACKET19998 |
|---|---|
| TRANSMITTING | PACKET19999 |

F I G. 1 1

| SEQUENCE ID | TRANSMITTING FLAG | Ack RECEPTION STATE |
|---|---|---|
| 0 | 0 | received |
| 1 | 0 | received |
| 2 | 0 | received |
| 3 | 0 | received |
| . . . | . . . | . . . |
| 8019 | 0 | received |
| 8020 | 1 | received |
| 8021 | 1 | received |
| 8022 | 1 | received |
| 8023 | 1 | received |
| . . . | . . . | . . . |
| 8699 | 0 | received |
| 8700 | 1 | received |
| 8711 | 0 | received |
| . . . | . . . | . . . |
| 9010 | 1 | received |
| 9011 | 1 | received |
| 9012 | 1 | received |
| . . . | . . . | . . . |
| 9021 | 1 | received |
| 9022 | 0 | received |
| . . . | . . . | . . . |
| 9999 | 0 | received |
| 10000 | 1 | waiting reception |
| . . . | . . . | . . . |
| 19999 | 1 | waiting reception |

FIG. 16

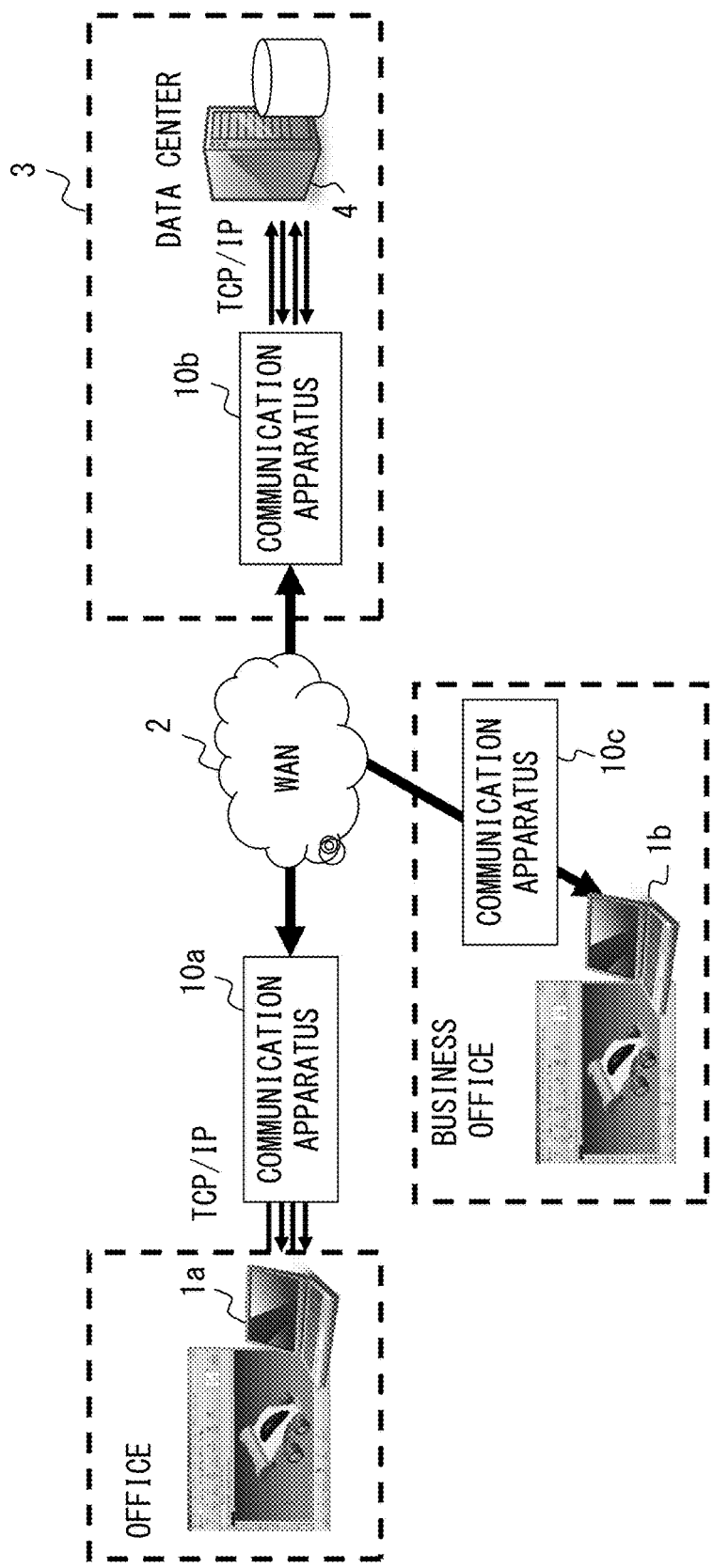
F I G. 17

COMMUNICATION METHOD AND COMMUNICATION APPARATUS

CROSS-REFERENCE TO RELATED APPLICATIONS

This application is a continuation application of International Application PCT/JP2013/057920 filed on Mar. 20, 2013 and designated the U.S., the entire contents of which are incorporated herein by reference.

FIELD

The embodiments discussed herein are related to communication performed between a plurality of communication apparatuses.

BACKGROUND

The popularization of cloud computing has led to a need for higher speed for communication, while the distance between communication apparatuses that engage in data transmission and reception is becoming longer due to factors such as business globalization. When communication is performed using a system such as Transmission Control Protocol (TCP) in which a packet lost during communication is retransmitted, the communication apparatus at the transmitting side decides the size of data to be transmitted next, and whether or not to perform the retransmission, using a confirmation acknowledgment packet from the communication apparatus at the receiving side. The Round Trip Time (RTT) in the route between the communication apparatus at the transmitting side and the communication apparatus at the receiving side becomes longer when the distance between the communication apparatus at the transmitting side and the communication apparatus at the receiving side is longer. For this reason, in communication that uses TCP, the communication speed becomes slower when the distance between the communication apparatus at the transmitting side and the communication apparatus at the receiving side becomes longer. Meanwhile, in the communication system that uses error correction, the communication apparatus at the transmitting side transmits a redundant packet in addition to the packet that includes data to be transmitted. When a packet loss occurs, the communication apparatus at the receiving side recovers data included in the lost packet using the redundant packet. For this reason, in the communication that uses error correction, while it is possible to avoid delay due to retransmission, there is a problem wherein the throughput is reduced because of the transmission of the redundant packet.

As a related art, a communication apparatus has been proposed that measures the jitter generated in the communication that uses the redundant packet and the jitter generated in the communication that uses the system in which the lost packet is retransmitted, and that transmits data using the communication system in which the jitter is smaller. Furthermore, a method has also been proposed in which the error correction mechanism is decided using a state parameter and a connection parameter. Here, a state parameter is quality information such as the bandwidth, the allowable delay time and the like that is required according to the application in which the data are used. Meanwhile, a connection parameter is information related to the communication connection.

Patent Document 1: International Publication Pamphlet No. WO2007/061087
Patent Document 2: Japanese National Publication of International Patent Application No. 2002-507369

The system in which the packet lost during communication is retransmitted has a problem in which, when the distance between the communication apparatus at the transmitting side and the communication apparatus at the receiving side becomes long, the communication speed falls due to an increase in the Round Trip Time. Meanwhile, the method in which the redundant packet used for error correction is transmitted has a problem in which the throughput is reduced because of the transmission of the redundant packet, while it is possible to avoid deterioration in the communication speed due to the retransmission process.

In the communication apparatus that performs communication while adopting the system in which the jitter is smaller among available systems, although the variation of the time needed for transmission of the respective packets may be reduced, it is impossible to increase the speed of the communication. In addition, in the system in which the error correction mechanism is decided using a state parameter and the like, the communication system is decided using quality information required by the application. For this reason, there is a problem in which, when the quality information is unknown, it is impossible to appropriately select the communication system. Therefore, the method in which the communication system is decided using quality information is not applicable to the communication apparatus that forwards data to be used in unspecified applications.

SUMMARY

According to an aspect of the embodiments, a network includes a first communication apparatus, a second communication apparatus, and a third communication apparatus. The second communication apparatus identifies, from packets received from the first communication apparatus, forwarding packets that are packets to be transmitted to the third communication apparatus, and measures the interval in receiving the forwarding packets from the first communication apparatus. The second communication apparatus forwards the forwarding packets to the third communication apparatus. The second communication apparatus receives report information that reports the reception state of forwarding packets from the third communication apparatus, and uses the report information to select target packets that are packets for which success in reception has not been reported from the third communication apparatus in the packets that were forwarded to the third communication apparatus. When the interval in receiving forwarding packets from the first communication apparatus exceeds a threshold, the second communication apparatus retransmits the target packets to the third communication apparatus in a format available for error correction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a communication method according to an embodiment.

FIG. 2 illustrates an example of a network.

FIG. 3 illustrates an example of the configuration of a communication apparatus.

FIG. 4 illustrates an example of the hardware configuration of a communication apparatus.

FIG. 9 illustrates an example of packet transmission and reception between communication apparatuses.

FIG. 10 illustrates an example of information included in a control acknowledgement packet.

FIG. 11 illustrates an example of the updating of a transmission table.

FIG. 16 illustrates a variation example of a transmission table.

FIG. 17 illustrates an example of a network.

DESCRIPTION OF EMBODIMENTS

Figure 5:
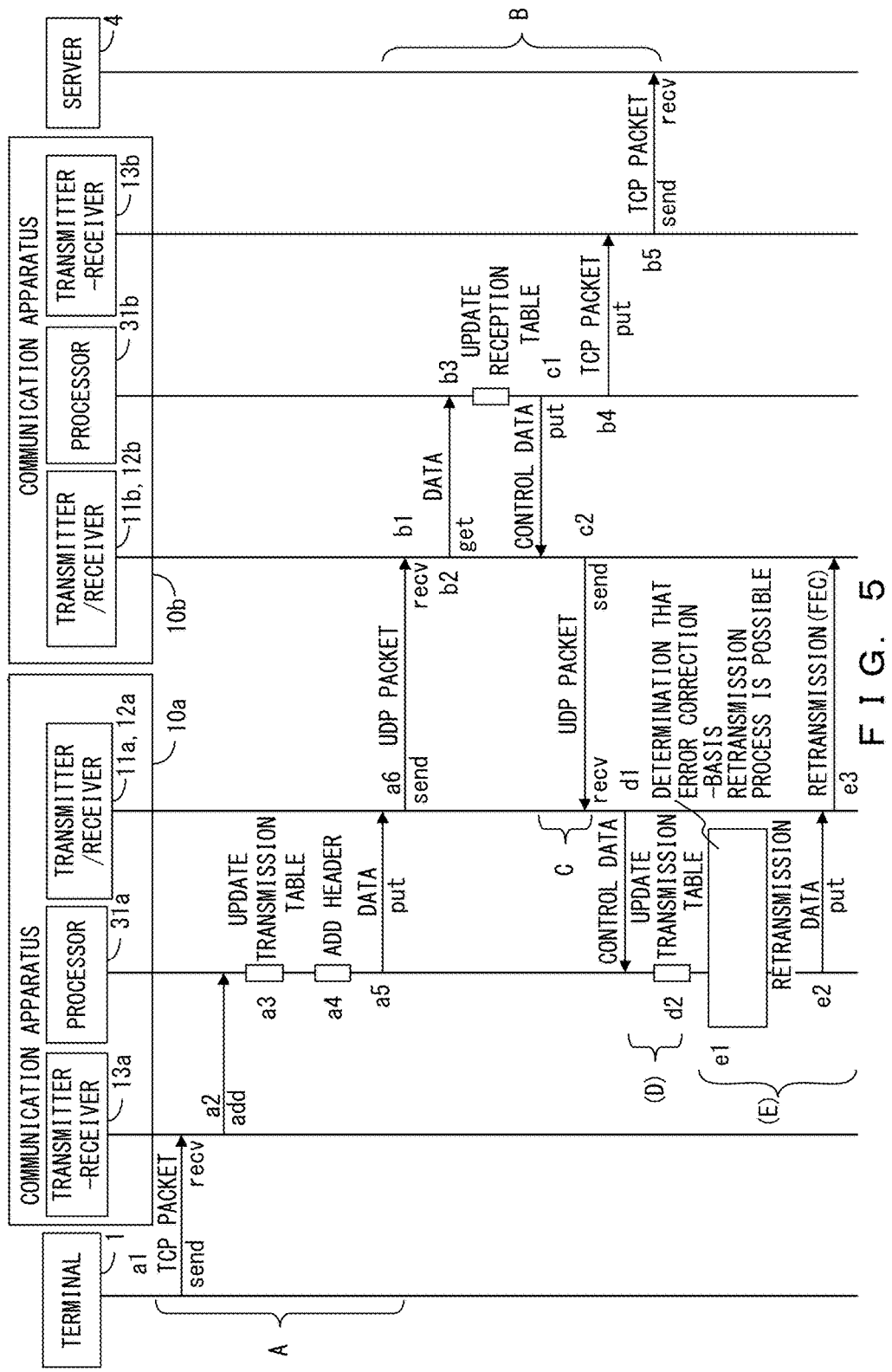
FIG. 5 is a sequence diagram illustrating an example of a communication method.

FIG. 1 illustrates an example of a communication method according to an embodiment. It is assumed that, in the example in FIG. 1, a terminal transmits the packet to a communication apparatus B. A communication apparatus A forwards the packet received from the terminal to the communication apparatus B. The thick arrow in FIG. 1 represents a plurality of packets. In FIG. 1, the combination of the character "P" and a number represents a packet transmitted from the terminal, and the number that follows P represents the sequence number of the packet. The white arrow indicates communication according to the communication system in which the packet that the receiving side failed to receive is retransmitted from the transmitting side. Hereinafter, the communication system in which the packet that the receiving side failed to receive is retransmitted from the transmitting side may be referred to as the "retransmission-basis" communication system. Meanwhile, the arrow with dots inside it indicates communication performed according to the communication system in which redundant packets used for error correction are transmitted. In the explanation below, the system in which redundant packets used for error correction are transmitted may be referred to as the "error correction-basis" transmission method.

In the procedure P1, the terminal transmits packets P0-P9999 to the communication apparatus B according to the retransmission-basis communication method. Here, it is assumed that the communication apparatus A was able to receive all the packets transmitted from the terminal.

In the procedure P2, the communication apparatus A forwards the packets received from the terminal to the communication apparatus B according to the retransmission-basis system. At this time, it is assumed that the communication apparatus B failed to receive the packet P100 in the packets transmitted from the communication apparatus A.

In the procedure P3, the terminal transmits packets P10000-P19999 to the communication apparatus B according to the retransmission-basis communication method.

The procedure P4 is performed as follows. The communication apparatus B transmits a control acknowledgment packet (Ack) for reporting the packet reception state to the communication apparatus A at prescribed time intervals. In the control acknowledgment packet, the reception state at the point in time when the control acknowledgement packet is generated is recorded. In the example of FIG. 1, the communication apparatus B transmits a control acknowledgment packet that reports the failure of reception of P100 to the communication apparatus A. The communication apparatus A recognizes that the transmission of P0-P99 and P101-P9999 was successful, and that the transmission of P100 to the communication apparatus B failed.

The procedure P5 is performed as follows. Between the transmission of the control acknowledgement packet from the communication apparatus B and the termination of the processing of the control acknowledgment packet, the communication apparatus A forwards the packets P10000-P19999 received from the terminal to the communication apparatus B according to retransmission-basis system.

The procedure P6 is performed as follows. It is assumed that the transmission of packets from the terminal to the communication apparatus B is interrupted. During the period in which transmission of packets from the terminal to the communication apparatus B is interrupted, the communication apparatus A does not receive any packets from the terminal, and therefore, forwarding of new packets from the communication apparatus A to the communication apparatus B is also interrupted. When the period in which no packets are received from the terminal exceeds a prescribed threshold Th, the communication apparatus A determines that the period of interruption of the forwarding process for new packets to the communication apparatus B has exceeded the threshold Th. Here, it is assumed that the threshold Th is set as a time that is shorter than the Round Trip Time (RTT). When the period of interruption of the forwarding process for new packets exceeds the threshold Th, the communication apparatus A retransmits packets for which success of forwarding has not been confirmed to the communication apparatus B using the error correction-basis transmission method. At this point in time, the communication apparatus A has not received any new control acknowledgement packets from the communication apparatus B and does not know whether the transmission of P10000-P19999 has been successful. In addition, the communication apparatus A has recognized that the forwarding of the packet P100 failed in the procedure P4. Therefore, the communication apparatus A retransmits the packets P100 and P10000-P19999 to the communication apparatus B on the error correction basis.

The communication apparatus B succeeds in receiving P100 and P10000-P19999 by means of the packets retransmitted from the communication apparatus A. In the procedure P6, the packets were transmitted on the error correction basis, and therefore, the communication apparatus B is able to recover the packets for which reception failed, using redundant packets or the like.

The procedure P7 is performed as follows. It is assumed that the terminal newly transmits packets P20000-P29999 to the communication apparatus A. Then, the communication apparatus A forwards P20000-P29999 to the communication apparatus B according to the retransmission-basis communication method.

As described above, when the period in which no new forwarding-target packets are received exceeds a threshold, the communication apparatus A determines that the band available for packet forwarding has increased. Then, in an interval in the forwarding of new packets, packets for which success of forwarding has not been confirmed are forwarded again in the error correction-basis communication method. Accordingly, to the packets for which the control acknowledgment packet is being awaited, the retransmission process is applied without waiting for the arrival of the control acknowledgment packet. Therefore, it follows that, for packets for which the control acknowledgement packet is being awaited and for which the first transmission has failed, retransmission is performed before the elapsing of the Round Trip Time (RTT). Therefore, using the communication method according to the embodiment, it becomes possible to suppress delay even when the RTT becomes longer.

Meanwhile, in the explanation below, the Round Trip Time between the communication apparatus A and the communication apparatus B is assumed to be the time from the time of transmission of a packet (measurement packet) used for the measurement of the time needed for communication until the time of reception of the acknowledgement packet for the measurement packet. For example, the RTT between the communication apparatus A and the communication apparatus B is from the time at which the communication apparatus A transmits the first measurement packet to the communication apparatus B until the time at which the communication apparatus A receives the second measurement packet transmitted from the communication apparatus B as an acknowledgement for the first measurement packet.

Incidentally, the communication apparatus according to the embodiment transmits redundant packets in the retransmission performed in an interval in the forwarding of new packets, but does not transmit redundant packets while retransmission-basis communication is performed. Accordingly, in the communication method according to the embodiment, the deterioration in the throughput due to transmission of redundant packets may be suppressed to be small.

Meanwhile, for the example in FIG. 1, in order to facilitate understanding, an explanation is provided for an example of a case in which packets addressed to the communication apparatus B are transmitted from the terminal, but packets from the terminal may also be forwarded to another apparatus via the communication apparatus B.

Example of Network and Apparatus Configuration

FIG. 2 illustrates an example of a network in which the communication apparatus 10 according to the embodiment is used. FIG. 2 illustrates an example of a network in which a terminal 1 and a server 4 in a data center 3 communicate across a Wide Area Network (WAN) 2. It is assumed that the data center 3 includes a communication apparatus 10b and the server 4. In addition, it is assumed that the terminal 1 accesses the WAN 2 via the communication apparatus 10a. Here, it is assumed that the communication apparatus 10a and the communication apparatus 10b are able to operate as a WAN speeding-up apparatus. Meanwhile, the number of the terminals 1 and the number of servers 4 included in the data center 3 may be an arbitrary number.

FIG. 3 illustrates an example of the configuration of the communication apparatus 10. The communication apparatus 10 is equipped with a transmitter 11, a receiver 12, a transmitter-receiver 13, a forwarding processing unit 14, a retransmission processing unit 15, a packet processing unit 16, a received packet managing unit 17, a band calculating unit 18, and a switching unit 20. The switching unit 20 has a measurement unit 21, a selecting unit 22, and a threshold calculating unit 23.

The transmitter 11 is used when the communication apparatus 10 transmits packets to an apparatus included in the WAN 2 or another communication apparatus 10. The transmitter 11 transmits packets that are input from the forwarding processing unit 14, the retransmission processing unit 15, the received packet management unit 17 and the like to a destination. The receiver 12 receives packets from an apparatus included in the WAN 2 or another communication apparatus 10. The receiver 12 outputs received packets to the packet processing unit 16. The transmitter-receiver 13 is used when the communication apparatus 10 transmits and receives packets to and from the terminal 1 and the server 4. The transmitter-receiver 13 outputs packets received from the terminal 1 to the selecting unit 22.

The forwarding processing unit 14 transforms a packet input from the selecting unit 22 into a packet to be transmitted to the WAN 2 using the retransmission-basis communication method, and outputs it to the transmitter 11. The retransmission processing unit 15 transforms a packet input from the selecting unit 22 into a packet to be transmitted to the WAN 2 using the error correction-basis communication method and outputs it to the transmitter 11. The formats of the packets are described later.

The packet processing unit 16, the received packet management unit 17, and the band calculating unit 18 perform processing when the communication apparatus 10 is receiving a packet from another communication apparatus 10 connected via the WAN 2. The packet processing unit 16 transforms a packet received from another communication apparatus 10 into a format available for transmission to the terminal 1 and the server 4. The packet processing unit 16 outputs the processed packet to the transmitter-receiver 13. Then, the transmitter-receiver 13 transmits the packet addressed to the terminal 1 or the server 4 to the terminal 1 or the server 4.

The received packet management unit 17 monitors the reception state at the packet processing unit 16. For example, the received packet management unit 17 identifies the largest value of the sequence IDs of the packets that are currently being received and the sequence IDs of packets that have been successfully received. The sequence ID is explained later. The received packet management unit 17 generates a control acknowledgment packet addressed to the communication apparatus 10 at the transmitting side using the identified information. The received packet management unit 17 outputs the control acknowledgment packet to the transmitter 11.

When the communication apparatus 10 is receiving packets from another communication apparatus 10 connected via the WAN 2, the band calculating unit 18 calculates the bandwidth used for the reception of the packets. The band calculating unit 18 reports the obtained bandwidth to the received packet management unit 17.

The measurement unit 21 measures the length of the period in which the communication apparatus 10 does not receive any packet from the terminal 1. When the communication apparatus 10 receives a packet from the terminal 1, the measurement unit 21 resets the measurement value to 0.

The selecting unit 22 outputs the packet input from the transmitter-receiver 13 to the forwarding processing unit 14. In addition, the selecting unit 22 monitors the transmission state of packets by identifying packets forwarded from the communication apparatus 10 to another communication apparatus 10 and packets for which control acknowledgement (Ack) has been received from the communication apparatus 10 of the transmission destination. When a period T in which the communication apparatus 10 does not receive any packets from the terminal 1 exceeds a threshold Th, the selecting unit 22 selects, in the sent packets, packets for which Ack has not been received. In other words, the selecting unit 22 selects packets that are to be the target of the error correction-basis retransmission process. The selecting unit 22 outputs the selected packets to the retransmission processing unit 15. The threshold calculating unit 23 calculates the threshold Th that the selecting unit 22 uses for determination, and outputs the obtained threshold to the selecting unit 22. In addition, the selecting unit 22 monitors the latest time at which the packet was transmitted from the transmitter 11.

FIG. 4 illustrates an example of the hardware configuration of the communication apparatus 10. The communication apparatus 10 is equipped with a processor 31, a memory 32, a bus 35, an external storage apparatus 36, and a network connection apparatus 39. In addition, as options, the communication apparatus 10 may also be equipped with an input apparatus 33, an output apparatus 34, and a medium driving apparatus 37. The communication apparatus 10 may be realized by a computer or the like, for example.

The processor 31 may be an arbitrary processing circuit that includes a Central Processing Unit (CPU). The processor 31 operates as the forwarding processing unit 14, the retransmission processing unit 15, the packet processing unit 16, the received packet management unit 17, the band calculating unit 18, and the switching unit 20. Meanwhile, the processor 31 may execute a program stored in the external storage apparatus 36, for example. The memory 32 stores data obtained by the operation of the processor 31, as well as data used for processes in the processor 31, as needed. The network connection apparatus 39 is used for communication with another apparatus and operates as the transmitter 11, the receiver 12, and the transmitter-receiver 13.

The input apparatus 33 is realized as a button, a keyboard or a mouse, for example, and the output apparatus 34 is realized as a display or the like. The bus 35 connects between the processor 31, the memory 32, the input apparatus 33, the output apparatus 34, the external storage apparatus 36, the medium driving apparatus 37, and the network connection apparatus 39 so that mutual data exchange may be performed. The external storage apparatus 36 stores a program, data and the like and gives the stored data to the processor 31 or the like, as needed. The medium driving apparatus 37 may output data of the memory 32 and the external storage apparatus 36 to a portable storage medium 38 and may read a program, data and the like from the portable storage medium 38. Here, the portable storage medium 38 may be an arbitrary storage medium that is portable, including a floppy disk, a Magneto-Optical (MO) disk, a Compact Disc Recordable (CD-R), and a Digital Versatile Disk Recordable (DVD-R).

First Embodiment

Hereinafter, processes in the communication apparatus 10 in a case in which communication is performed between the terminal 1 and the server 4 in the network illustrated in FIG. 2 are explained. FIG. 5 is a sequence diagram illustrating an example of a communication method, and processes performed in the communication apparatus 10a and the communication apparatus 10b are explained separately as A-E of FIG. 5. In the example below, the communication apparatus 10a transmits and receives TCP packets to and from the terminal 1, and the communication apparatus 10b transmits and receives TCP packets to and from the server 4. Meanwhile, the example is for a case in which the communication apparatus 10a transmits data to the communication apparatus 10b. In addition, in the first embodiment, in order to facilitate understanding, it is assumed that the communication apparatus 10a and the communication apparatus 10b communicate using a dedicated line provided in the WAN 2. Furthermore, in order to make it easy to distinguish the operations of the communication apparatus 10a and the communication apparatus 10b, the letter included in the number for the communication apparatus 10 that is performing the process is added to the end of the number of the portions in the communication unit 10. For example, the measurement unit 21a is the measurement unit 21 included in the communication apparatus 10a, and the received packet management unit 17b is the received packet management unit 17 included in communication apparatus 10b.

(A) Forwarding Process for the Packet Received from the Terminal 1

First, the terminal 1 transmits data addressed to the server 4 to the communication apparatus 10a. The communication between the terminal 1 and the communication apparatus 10a is performed using the TCP protocol as illustrated in a1 of FIG. 5, and the confirmation acknowledgement and the retransmission process are performed as needed. When starting communication with the terminal 1, the communication apparatus 10a assigns an identification number (TCP application identifier) for uniquely identifying the terminal 1 that is performing the TCP communication to the connection used for the communication with the terminal 1.

Here, it is assumed that packets P0-P19999 are transmitted to the communication apparatus 10a in a continuous manner. The measurement unit 21a of the communication apparatus 10a resets the length of the period in which no packets are received to 0 every time the communication apparatus 10a receives a packet from the terminal 1. The selecting unit 22a of the communication apparatus 10a at the transmitting side obtains the packet P0 from the transmitter-receiver 13a and creates a transmission table (a2 and a3 in FIG. 5).

Figure 6A:
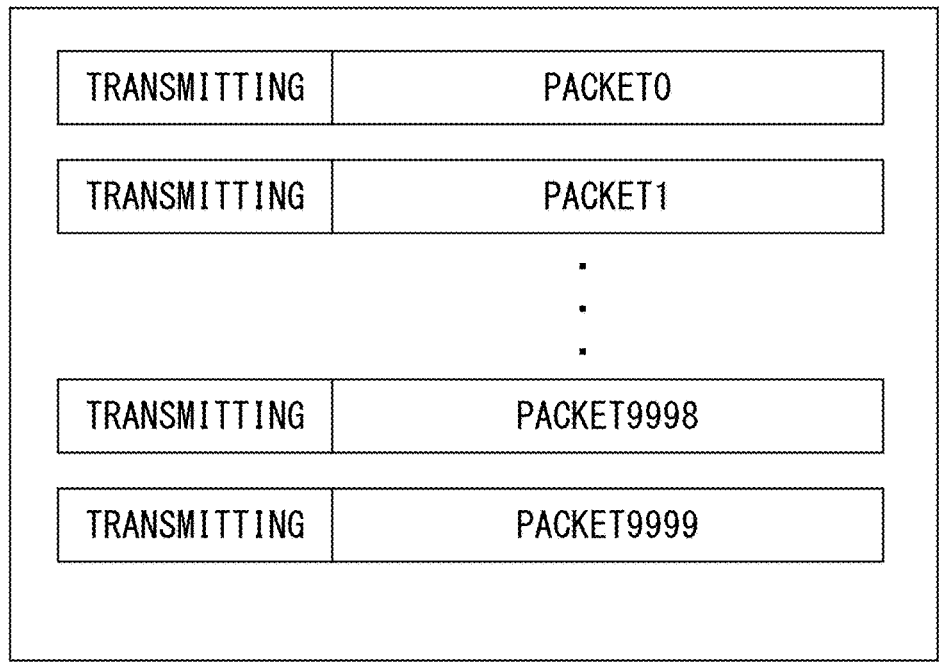
FIG. 6A illustrates an example of a transmission table.

FIG. 6A illustrates an example of the transmission table. The transmission table keeps packets received from the terminal 1. The transmitter-receiver 13a outputs the packet P0 to the selecting unit 22a. At this time, the selecting unit 22a attaches a flag to the packet P0 that indicates that it is currently being transmitted, because the packet P0 is a packet that is the target of forwarding from the terminal 1 to the server 4. Hereinafter, the flag that indicates that the transmission is currently being performed may be referred to as the "transmitting flag". Then, the selecting unit 22a assigns a sequence ID to each packet received from the terminal 1, for each TCP application identifier, as an identifier to indicate the order of packets received via the same connection. It is assumed that the selecting unit 22a gives the sequence ID 0 to the packet received first via the connection identified by the TCP application identifier, and assigns sequence IDs so as to follow the order of the received packets. In the explanation below, for the sake of clarity, an explanation is provided for an example of a case in which the sequence number of the first packet transmitted from the terminal 1 is 0. Therefore, in the example below, the sequence number in the TCP header of a packet and the sequence ID assigned to the packet is the same value. The selecting unit 22a creates a hash table with the sequence ID assigned to the packet P0 as the key, and stores the packet P0. Then, the selecting unit 22a associates the packet P0 input from the transmitter-receiver 13a with the TCP application identifier and the sequence ID and outputs it to the forwarding processing unit 14a.

The same process as that for P0 is performed when packets P1-P9999 are received. Accordingly, it follows that the selecting unit 22a is to be provided with a hash table that stores information illustrated in FIG. 6A. Then, the selecting unit 22a outputs P0-P9999 to the forwarding processing unit 14a. The forwarding processing unit 14a transforms the packet input from the selecting unit 22a into a forwarding packet (a4 in FIG. 5).

Figure 7:
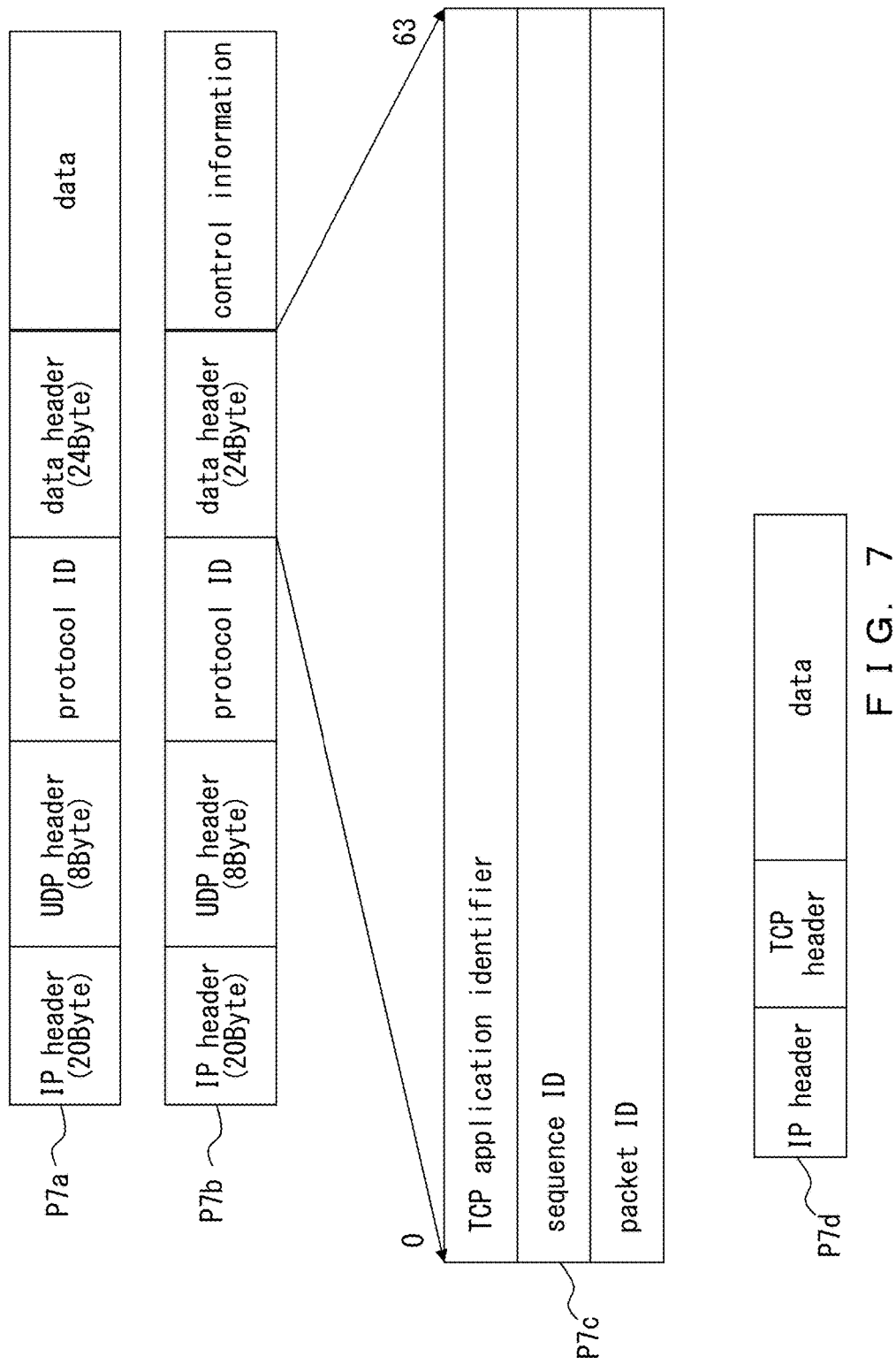
FIG. 7 illustrates examples of the formats of packets.

FIG. 7 illustrates examples of the formats of packets. FIG. 7 illustrates examples of packets transmitted and received between the communication apparatus 10a and the communication apparatus 10b. The packet used for transmission and reception between the communication apparatus 10a and the communication apparatus 10b may be referred to as a "forwarding packet". P7a in FIG. 7 is an example of the format of the packet used for the forwarding of data. The forwarding packet used for the forwarding of data includes an Internet Protocol (IP) header, a User Datagram Protocol (UDP) header, protocol ID information, a data header, and data. The format of the IP header and the UDP header is as defined by the protocol for each. The protocol ID stores information for determining whether the forwarding packet is used for the forwarding of data or for the retransmission of data. The data header includes a TCP application identifier, a sequence ID, and a packet ID, as illustrated in P7c in FIG. 7. Data are data transmitted by means of the forwarding packet.

P7d in FIG. 7 illustrates an example of the packet input from the selecting unit 22a to the forwarding processing unit 14a. The packet input from the selecting unit 22a to the forwarding processing unit 14a includes an IP header, a TCP header, and data. The forwarding processing unit 14a does not change the IP header of the packet input from the selecting unit 22a.

Figure 8A:
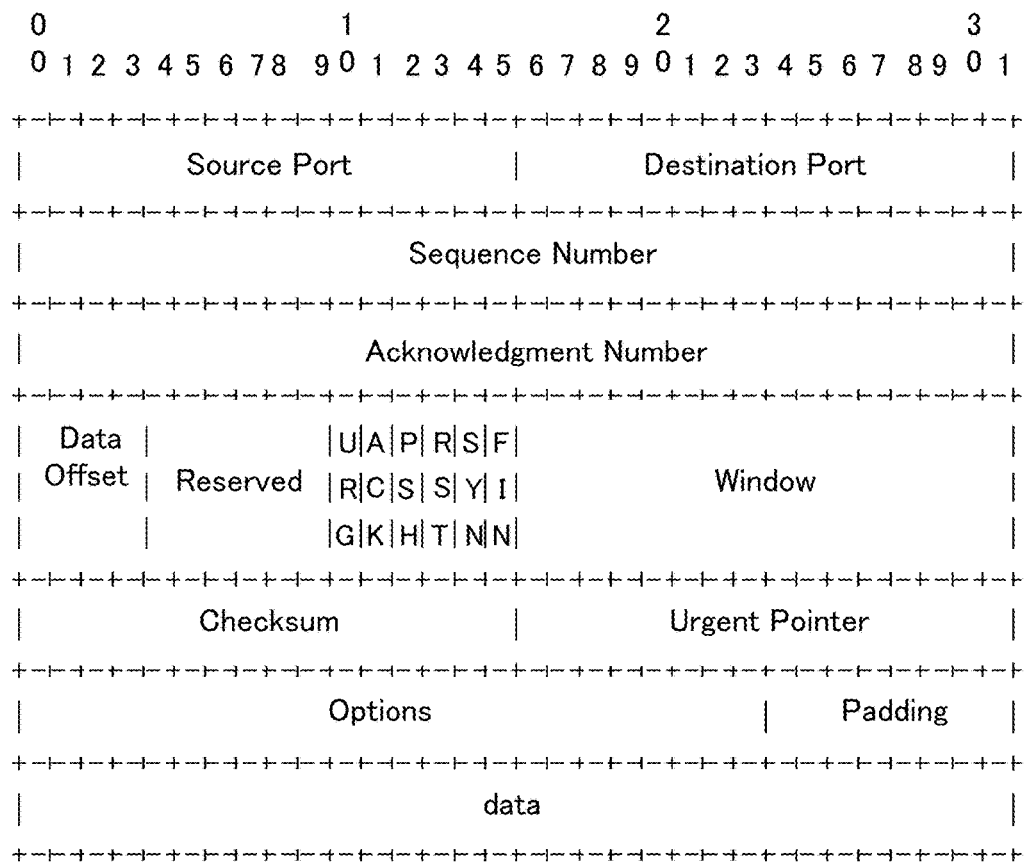
FIG. 8A illustrates the format of a TCP header.
Figure 8B:
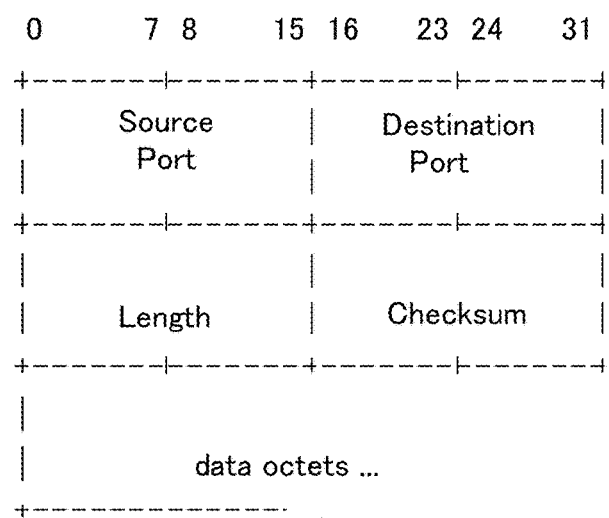
FIG. 8B illustrates the format of a UDP header.

An example of information elements included in the TCP header are illustrated in FIG. 8A. The TCP header includes Source Port Number, Destination Port Number, Sequence Number, Acknowledgment Number, Data Offset, Reserved Area, Control Bits, Window Size, Checksum, Urgent Pointer, and Options. Meanwhile, the UDP header includes Source Port Number, Destination Port Number, Segment size, and Checksum as illustrated in FIG. 8B.

Then, when the packet P0 is input from the selecting unit 22a, the forwarding processing unit 14a obtains the source port number, destination port number, and sequence number from the TCP header of the packet P0. The forwarding processing unit 14a sets the obtained source port number and destination port number as the source port number and destination port number of the UDP header of the forwarding packet. The forwarding processing unit 14a includes the TCP application identifier and the sequence ID reported from the selecting unit 22a in the data header. The forwarding processing unit 14 records the sequence number included in the TCP header of the packet received from the terminal 1 as the packet ID in the data header.

Then, the forwarding processing unit 14a sets the protocol ID to a value that represents the forwarding of data. The forwarding processing unit 14a sets data of the packet P0 as the data of the forwarding packet, and sets the segment size and the checksum. By the processes described above, the forwarding processing unit 14a transforms the packet P0 into a forwarding packet that includes the data transmitted by means of the packet P0. The forwarding processing unit 14a outputs the generated forwarding packet to the transmitter 11a (a5 in FIG. 5).

FIG. 9 illustrates an example of transmission and retransmission of packets between the communication apparatus 10a and the communication apparatus 10b. The transmitter 11a transmits the forwarding packet input from the forwarding processing unit 14a to the communication apparatus 10b (a6 in FIG. 5). The selecting unit 22a memorizes the time at which the transmitter 11a transmitted the forwarding packet as the last transmission time. The forwarding packet (U0) in FIG. 9 represents the forwarding packet transformed from the packet P0. The transforming process at the forwarding processing unit 14a and the transmission process from the transmitter 11a are performed for other packets forwarded from the communication apparatus 10a to the communication apparatus 10b in a manner similar to that for the packet P0. It is assumed that each packet transmitted from the communication apparatus 10a to the communication apparatus 10b in FIG. 9 is a forwarding packet to which the sequence ID that is the same value as the number following U is attached. Meanwhile, the selecting unit 22a updates the last transmission time to a new transmission time every time a forwarding packet is transmitted from the communication apparatus 10a.

(B) Reception Process and Forwarding Process to the Server 4 Performed in the Communication Apparatus 10b The communication apparatus 10b receives the forwarding packet from the communication apparatus 10a (b1 in FIG. 5). The receiver 12b of the communication apparatus 10b outputs the received packet to the packet processing unit 16b (b2 in FIG. 5). The packet processing unit 16b extracts the sequence ID and the TCP application identifier from the data header in the forwarding packet that has been input, and outputs the obtained values to the received packet management unit 17b. The received packet management unit 17b associates the value input from the packet processing unit 16b with the TCP application identifier and stores it as the sequence ID of the packet that has been successfully received from the communication apparatus 10a. The sequence ID=0 is obtained from the forwarding packet U0, and therefore, the received packet management unit 17b recognizes that the reception of the packet of the sequence ID=0 has been successful.

Next, the packet processing unit 16b generates a TCP header that includes information in the UDP header and the packet ID in the data header of the forwarding packet. Here, the packet processing unit 16b sets the packet ID as the sequence number in the TCP header. Then, the packet processing unit 16b sets the source port number and destination port number in the UDP header as the source port number and destination port number in the TCP header. The processing unit 16b removes the UDP header, the protocol ID, and the data header from the forwarding packet, and includes the generated TCP header instead of these pieces of information, thereby generating a TCP packet that includes the information transmitted from the terminal 1 (b4 in FIG. 5). For example, from the forwarding packet U0, a TCP packet that includes the information transmitted by means of the packet P0 is generated. The packet processing unit 16b outputs the generated packet to the transmitter-receiver 13b. The transmitter-receiver 13b transmits the packet input from the packet processing unit 16b to the server 4 (b5 in FIG. 5).

The communication apparatus 10b processes other received forwarding packets in a similar manner. Accordingly, information included in the forwarding packet that the communication apparatus 10b successfully received from the communication apparatus 10a is transmitted to the server 4. Then, the band calculating unit 18b calculates the bandwidth that was used for the reception of the packet. The received packet management unit 17b stores the sequence ID included in a packet that the communication apparatus 10b has successfully received from the communication apparatus 10a. For example, communication apparatus 10b may keep a table (reception table) that records the sequence IDs of received packets (b3 in FIG. 5). Here, it is assumed that packets that have the sequence IDs 0-8019, 8024-8699, 8701-9009, and 9022-9999 have been successfully received. The received packet management unit 17b stores the sequence IDs of the packets that have been successfully received.

(C) Transmission of the Control acknowledgment Packet from the Communication Apparatus 10b The communication apparatus 10b reports the reception state in a prescribed cycle by transmitting a control acknowledgment packet (Ack) to the communication apparatus 10a. The format of the packet used for reporting control information is illustrated in FIG. 7 (P7b). The packet used for reporting control information includes an IP header, a UDP header, protocol ID information, a data header, and control information. In the case of a control acknowledgment packet, the protocol ID information is set to Ack, and information that identifies packets that have been successfully received is recorded in the control information.

FIG. 10 illustrates an example of information included in the control information of a control acknowledgment packet. The control information in a control acknowledgment packet includes control information identifier, received size, maximum received size, reception band, acknowledgment request information, retransmission start ID, and retransmission start sequence length. The control information identifier is the TCP application identifier included in the packet that is the target for which the reception state is to be reported. The received size is the value that indicates in bytes the total amount of data obtained from the packets of the same TCP application identifier up to the end of the packets that have been successfully received in a continuous manner among packets which have equal TCP application identifiers. By dividing the received size by the size of the payload in one forwarding packet, the largest value in the sequence IDs that have been successfully received in a continuous manner is obtained. Meanwhile, it is assumed that the size of the payload in a forwarding packet is set in the communication apparatus 10a and the communication apparatus 10b in advance. The maximum received size is the product of the largest value in the sequence IDs attached to the packets that have been successfully received and the byte count of the payload of the forwarding packet. The reception band is the bandwidth that the communication apparatus 10b used for the reception of forwarding packets from the communication apparatus 10a. The reception band of the communication apparatus 10b is calculated by the band calculating unit 18b.

The retransmission start ID and the retransmission start sequence length are used as a combination. The retransmission start ID is the value that becomes the smallest sequence ID in each group when packets that the communication apparatus 10b failed to receive are divided into groups with the sequence IDs in each group being successive numbers. The retransmission start sequence length is the number of packets that belong to the group whose smallest value is the retransmission start ID for which reception has failed. The acknowledgment request information is a value that indicates whether or not to request Ack for packets. In the case of the retransmission-basis transmission method, the acknowledgment request information is set to a value that indicates that Ack is required. On the other hand, in the cases such as the error correction-basis retransmission and a control packet for reporting Ack, the acknowledgment request information is set to a value that indicates that Ack is not required.

FIG. 10 is an example of control information in a control acknowledgment packet generated by the communication apparatus 10b. The communication apparatus 10b has successfully received packets whose sequence IDs are 0-8019, 8024-8699, 8701-9009, and 9022-9999. Accordingly, the received packet management unit 17b of the communication apparatus 10b generates a control acknowledgment packet for requesting the communication apparatus 10a to retransmit packets assigned the sequence IDs 8020-8023, 8700, and 9010-9021. The received packet management unit 17b sets the received size as 8019×U, and the maximum received size as 10000×U. Here, U is the payload length of the forwarding packet. Then, the received packet management unit 17b specifies 8020, 8700, and 9010 as the retransmission start ID. Then, the received packet management unit 17b requests the retransmission of the packets assigned the sequence IDs 8020-8023 by specifying 4 as the retransmission start sequence length. In a similar manner, the received packet management unit 17b specifies the retransmission start sequence length corresponding to the retransmission start ID=8700 as 1 and specifies the retransmission start sequence length corresponding to the retransmission start ID=9010 as 11. Then, the received packet management unit 17b includes the reception band obtained by the band calculation unit 18b in the control acknowledgment packet (c1 in FIG. 5).

The received packet management unit 17b attaches, to the control acknowledgment packet, an IP header in which the communication apparatus 10a is specified as the destination and the communication apparatus 10b is specified as the transmission source. Then, the received packet management unit 17b appropriately sets the UDP header, the data header and the like, and includes information that indicates that it is a control acknowledge packet in the protocol ID. The received packet management unit 17b outputs the generated control acknowledgment packet to the transmitter 11b. The transmitter 11b transmits the input control acknowledge packet to the communication apparatus 10a (c2 in FIG. 5).

(D) Transmission History Management Using the Control Acknowledgment Packet

Figure 6B:
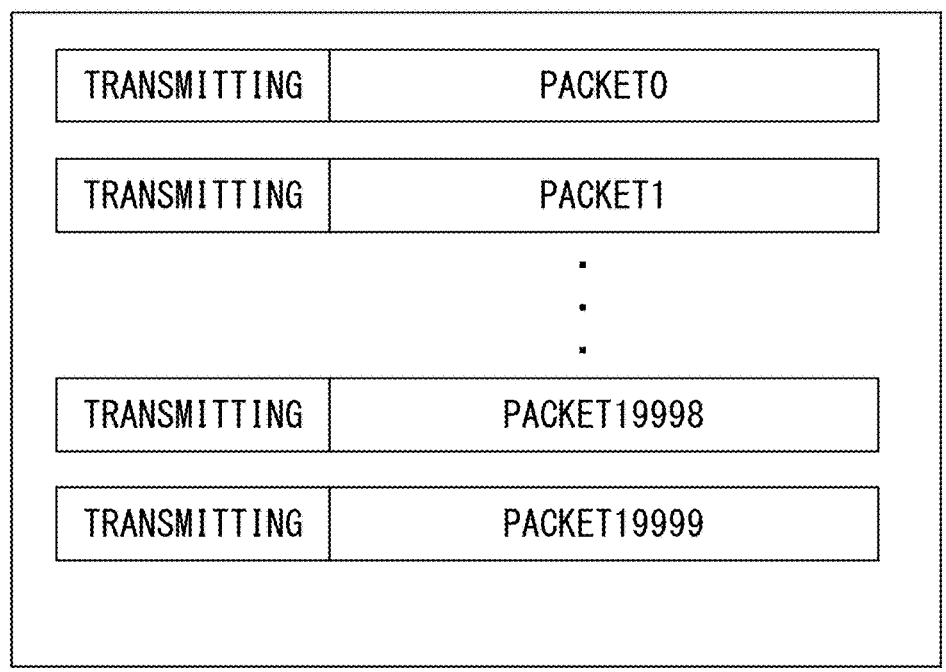
FIG. 6B illustrates an example of a transmission table.

It is assumed that the communication apparatus 10a transmitted packets whose sequence IDs are 10000-19999 to the communication apparatus 10b after transmission of the packet of sequence ID=9999 and before the receiving of a control packet from the communication apparatus 10b. Then, before receiving a control acknowledgment packet from the communication apparatus 10b, the selecting unit 22a has the information illustrated in FIG. 6B as the information of packets that are currently being transmitted.

After that, the receiver 12a receives a control acknowledgment packet that includes the information explained with reference to FIG. 10. The receiver 12a outputs the control acknowledgment packet to the packet processing unit 16a (d1 in FIG. 5). When the value of the protocol ID is information that indicates that it is a control acknowledgment packet, the packet processing unit 16a outputs the input packet to the selecting unit 22a. When the control acknowledgment packet is input, the selecting unit 22a updates the information of the packets that are currently being transmitted, according to the reception state at the communication apparatus 10b.

FIG. 11 illustrates an example of the update of the transmission table. The selecting unit 22a deletes, from the control acknowledgement packet, information of packets for which success of transmission has been confirmed. For example, upon receiving a control acknowledgment packet that includes information illustrated in FIG. 10, the selecting unit 22a determines that the transmission of the packets whose sequence IDs are 0-8019, 8024-8699, 8701-9009, 9022-9999 has been successful. Meanwhile, the selecting unit 22a determines that the transmission of the packets assigned the sequence IDs 8020-8023, 8700, and 9010-9021 has failed. In addition, regarding the packets whose sequence IDs are 10000-19999, it is determined that the transmission success status is unknown, because the control acknowledgement packet has not been received. Then, by deleting information of the packets that have been determined as having been successfully transmitted, the information of packets that are currently being transmitted is updated from the information illustrated in FIG. 6B to the information illustrated in FIG. 11 (d2 in FIG. 5).

Figure 12:
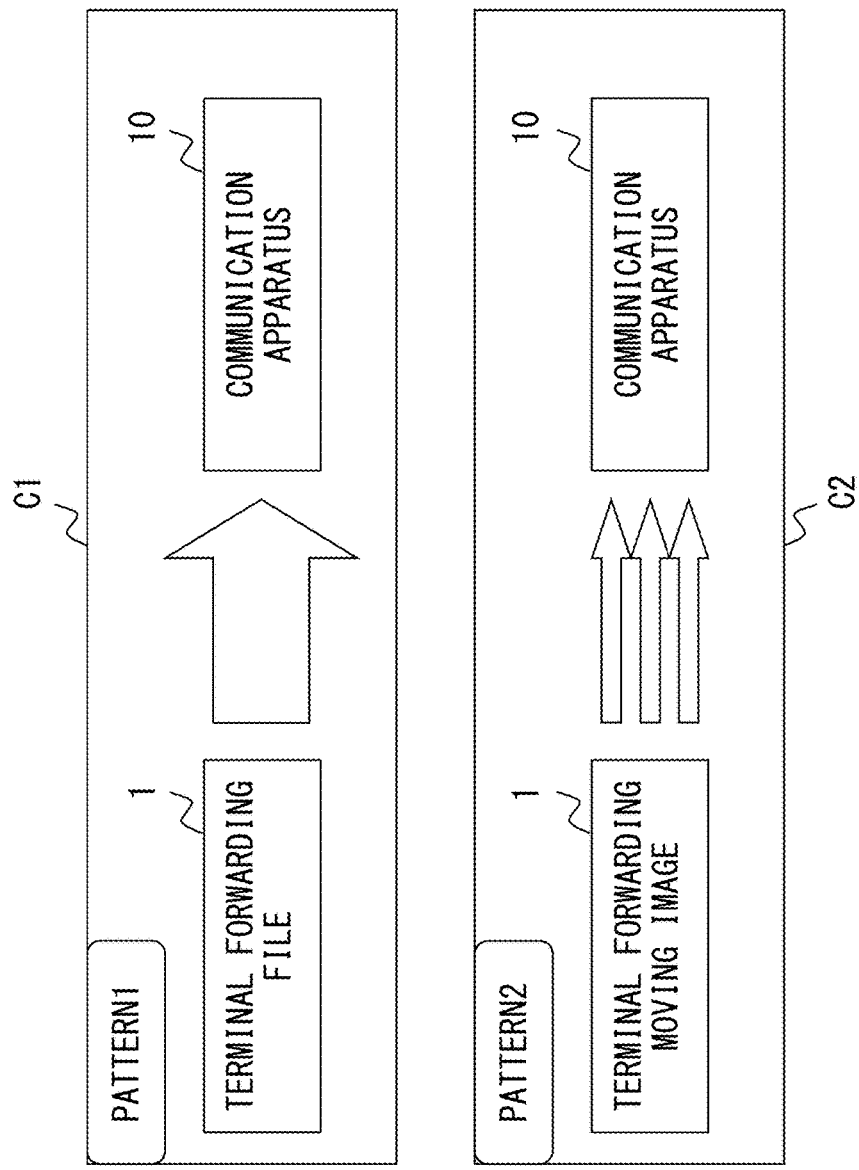
FIG. 12 illustrates an example of the transmission pattern of packets according to the type of transmission data.

(E) Error Correction-Basis Retransmission Performed during Interval in Forwarding of New Packets FIG. 12 illustrates examples of packet transmission patterns according to the type of transmission data. When file forwarding is performed, data transmissions from the terminal 1 are performed in a continuous manner. Accordingly, as illustrated in C1 of FIG. 12, the time interval during which the communication apparatus 10a does not receive any packets from the terminal 1 is relatively short. In other words, the communication apparatus 10a receives packets from the terminal 1 in a continuous manner. On the other hand, when transmission data are moving images or the like, there are periods in which no packets are transmitted from the terminal 1, according to the moving image frame rate, as illustrated in C2 of FIG. 12. For this reason, when moving images are forwarded from the terminal 1, the period in which the communication apparatus 10a does not receive any packets from the terminal 1 is longer than the case in which file forwarding is performed.

When the communication apparatus 10a does not receive any packets from the terminal 1, the communication apparatus 10a does not forward any new packets to the communication apparatus 10b, and therefore, there is a possibility that an available capacity will appear in the communication line of the communication apparatus 10a and the communication apparatus 10b. Then, communication apparatus 10a retransmits, on the error correction basis, the packets for which the success of transmission has not been confirmed, using the available capacity that appeared due to the absence of forwarding of new packets. Hereinafter, an explanation is provided starting from the method for determining whether or not to perform the error correction-basis retransmission and up to the retransmission process.

The threshold calculating unit 23a of the communication apparatus 10a calculates the threshold that is used for determining whether or not to perform error correction-basis retransmission. The selecting unit 22a selects packets to be the target of retransmission, and reports the data amount of the selected packets to the threshold calculating unit 23a. Here, in addition to packets for which failure of transmission has been reported, the selecting unit 22a also regards packets for which the reception state has not been reported by means of the control acknowledgment packet as the retransmission target. Therefore, in the example explained using FIG. 11, the selecting unit 22a regards the packets whose sequence IDs are 8020-8023, 8700, 9010-9021, and 10000-19999 as the retransmission target.

Threshold calculating unit 23a obtains the threshold as the time in which it is possible to transmit, in the unused bandwidth, the information amount of the redundant portion that is transmitted when performing error correction-basis retransmission of data for which reception has not been confirmed, and reports the obtained value to the selecting unit 22a. The threshold calculating unit 23a calculates the threshold Th according to the formula below. Meanwhile, here, explanation is provided for a case in which the threshold Th is smaller than the Round Trip Time (RTT).

$$Th = X \times A / (B - B_{used})$$

Here, X is a value that represents in bytes the total amount of data to be transmitted. A is the ratio of the amount of data included in the packet as the redundant portion transmitted for performing error correction-basis retransmission to the total amount of data that are the target of the retransmission. While A may be arbitrarily set according to the retransmission system, it may be set to a value of about 0.1-0.2 for example. B is the bandwidth of the line that connects the communication apparatus 10a and the communication apparatus 10b. Meanwhile, it is assumed that the threshold calculating unit 23a has stored the value of A and the bandwidth (B) in advance, or reads them from the memory 32a. $B_{used}$ is the bandwidth used for the communication between the communication apparatus 10a and the communication apparatus 10b, for which a value reported from the communication apparatus 10b by means of the control acknowledgment packet is used. Therefore, $(B-B_{used})$ is the bandwidth of the empty band that is not used for the communication between the communication apparatus 10a and the communication apparatus 10b.

The selecting unit 22a obtains, from the measuring unit 21a, the value of the period in which the communication apparatus 10a does not receive any packets from the terminal 1 and compares it with the threshold Th. Here, it is assumed that the period in which the communication apparatus 10a does not receive any packets from the terminal 1 exceeded the threshold Th. Then, the selecting unit 22a determines that it is possible to perform the error correction-basis retransmission process (e1 in FIG. 5).

The selecting unit 22a outputs, to the retransmission processing unit 15a, packets to be the target of the retransmission process. The retransmission processing unit 15a makes the data included in the packet input from the selecting unit 22a redundant so that error correction may be performed. For example, the retransmission processing unit 15a generates a redundant packet used for error correction by applying Forward Error Correction (FEC) according to the data of the packet input from the selecting unit 22a. Then, the retransmission processing unit 15a attaches header information to each packet and each redundant packet. The retransmission processing unit 15a attaches the header information in a similar procedure to the procedure in which the forwarding processing unit 14a generated the forwarding packet. However, in the protocol ID information, the retransmission processing unit 15a records information that indicates that it is an error correction-basis retransmission packet. The retransmission processing unit 15a outputs the generated packet to the transmitter 11a (e2 in FIG. 5). The transmitter 11a transmits the packet input from the retransmission processing unit 15a to the communication apparatus 10b (e3 in FIG. 5). The selecting unit 22a deletes, from the transmission table, the packet transmitted on the error correction basis from the retransmission processing unit 15a.

Figure 13:
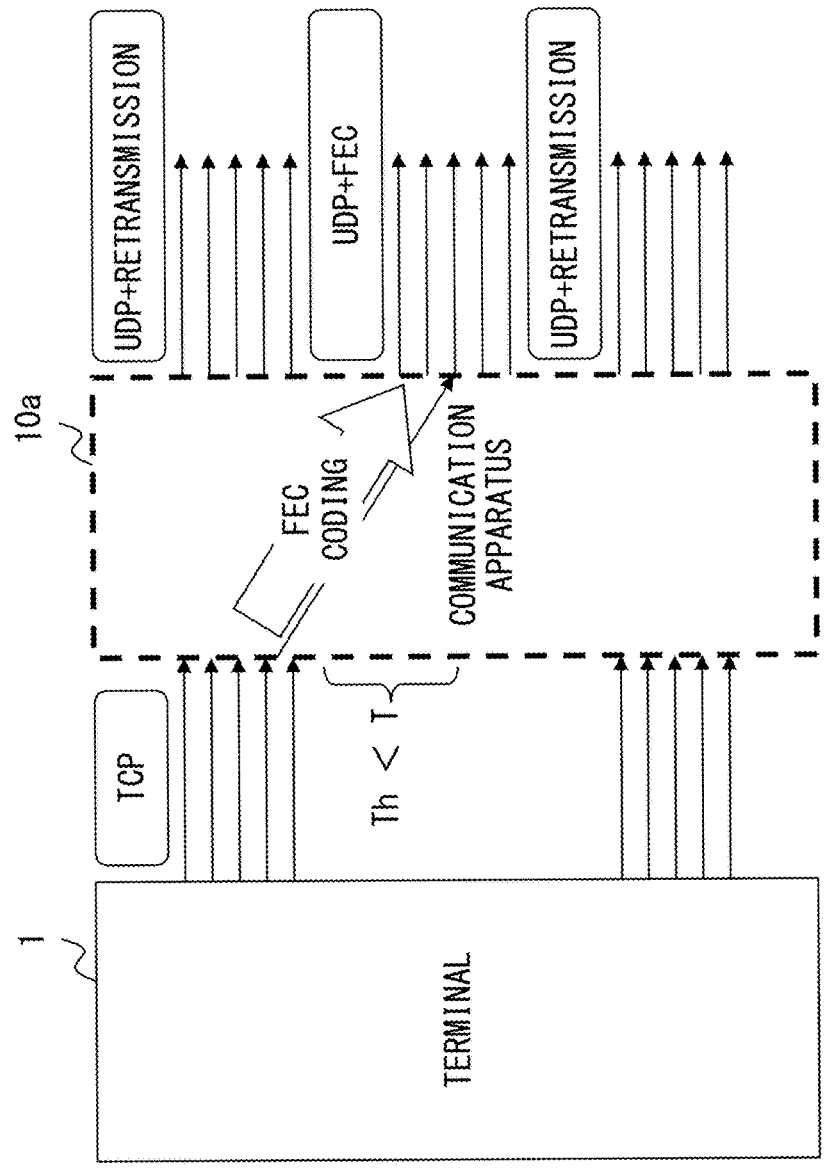
FIG. 13 illustrates an example of processes in a communication apparatus.

FIG. 13 illustrates an example of processes in the communication apparatus according to the embodiment. While receiving TCP packets from the terminal 1, the communication apparatus 10a transforms the received packet into a UDP packet and transmits it to the communication apparatus 10b. The communication apparatus 10a receives a control acknowledgement packet (Ack) that includes information of the reception table generated by the received packet management unit 17b of communication apparatus 10b in a prescribed cycle and performs the retransmission process according to the control acknowledgment packet. Meanwhile, when performing retransmission while receiving TCP packets from the terminal 1, the communication apparatus 10a performs retransmission-basis retransmission for packets for which transmission has failed.

Meanwhile, when the period in which no TCP packets are received from the terminal 1 exceeds a prescribed period, the communication apparatus 10a of the selecting unit 22a determines that there is an available space in the line due to the absence of new packets forwarded between the communication apparatus 10a and the communication apparatus 10b. Accordingly, the selecting unit 22a selects packets for which reception has not been confirmed and outputs them to the retransmission processing unit 15a. The retransmission processing unit 15a renders the packets input from the selecting unit 22a in a format available for error correction using FEC coding, and performs the retransmission process. When transmission of TCP packets from the terminal 1 is resumed, the communication apparatus 10a forwards packets again according to the communication method that does not use redundant packets.

Figure 14:
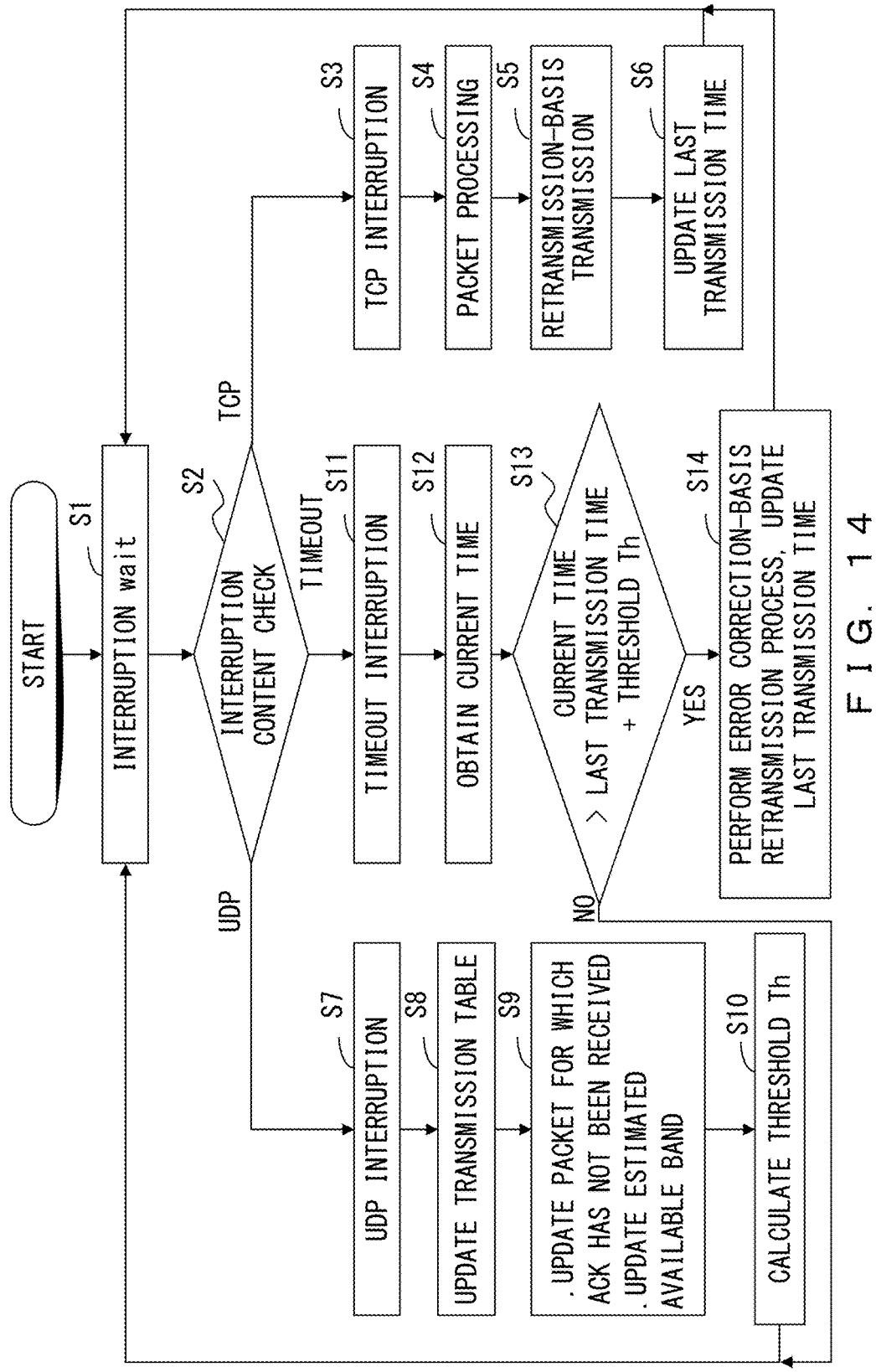
FIG. 14 is a flowchart illustrating processes in a communication apparatus.

FIG. 14 is a flowchart illustrating an example of processes in the communication apparatus. In the process example in FIG. 14, it is assumed that the time needed for the process for transforming a TCP packet to a forwarding packet and transmitting it does not change depending on the packet. Therefore, the measurement unit 21 treats the difference between the time at which transmission from the transmitter 11 was last performed (the last transmission time) and the current time as an approximate value of the period in which the communication apparatus 10 does not receive any packets from the terminal 1. In addition, it is assumed that the measurement unit 21 has a timer set to a value that is sufficiently shorter than the threshold Th and requests that the selecting unit 22 determine whether or not to perform error correction-basis retransmission every time the timer expires.

The processor 31 operating as the switching unit 20 and the packet processing unit 16 waits until there is a request for interruption (step S1). When there is an interruption, the processor 31 determines the content requested by the interruption (step S2). When the interruption indicates reception of a TCP packet, the received packet from the terminal 1 has been input to the selecting unit 22a (step S3). Then, the selecting unit 22 outputs the TCP packet to the forwarding processing unit 14, and the forwarding processing unit 14 transforms the TCP packet to a forwarding packet (step S4). The forwarding processing unit 14 forwards the forwarding packet according the retransmission-basis forwarding method to the communication apparatus 10 at the receiving side via the transmitter 11 (step S5). The selecting unit 22 updates the last transmission time to the current time (step S6).

In step S2, when the interruption indicates reception of a UDP packet, a control acknowledgment packet from the communication apparatus 10 at the receiving side has been input to the selecting unit 22 (step S7). The selecting unit 22 updates the transmission table using the control acknowledgment packet (step S8). The selecting unit 22 further updates the amount of packets that are to be the target of retransmission due to the absence of reception of Ack, and the estimate value of the available band (step S9). The threshold calculating unit 23 calculates the threshold Th using the value of the available band (step S10).

In step S2, when it is determined that the interruption is due to the expiration of the timer held by the measurement unit 21, the measurement unit 21 requests the selecting unit 22 to determine whether or not to perform the error correction-basis retransmission process (step S11). Then, the selecting unit 22 obtains the current time (step S12). The selecting unit 22 compares the time obtained by adding the threshold to the last transmission time with the current time (step S13). When the time obtained by adding the threshold to the last transmission time is a time later than the current time, the time that has elapsed since a packet was last forwarded to the communication apparatus 10 at the receiving side is shorter than the threshold. In this case, the selecting unit 22 determines that there is not yet a sufficient available band with the communication apparatus 10 at the receiving side for performing error correction-basis retransmission, and return to step S1 is performed (No in step S13). When the time obtained by adding the threshold to the last transmission time is a time after the current time, the time that has elapsed since a packet was last forwarded to the communication apparatus 10 at the receiving side is equal to or longer than the threshold. In this case, the selecting unit 22 determines that there is an available band with the communication apparatus 10 at the receiving side that is sufficient for performing error correction-basis retransmission, and requests the retransmission processing unit 15 to perform error correction-basis retransmission (Yes in step S13). The retransmission processing unit 15 performs the error correction-basis retransmission process according to the request from the selecting unit 22. In addition, the selecting unit 22 updates the last transmission time to the current time (step S14).

Figure 15:
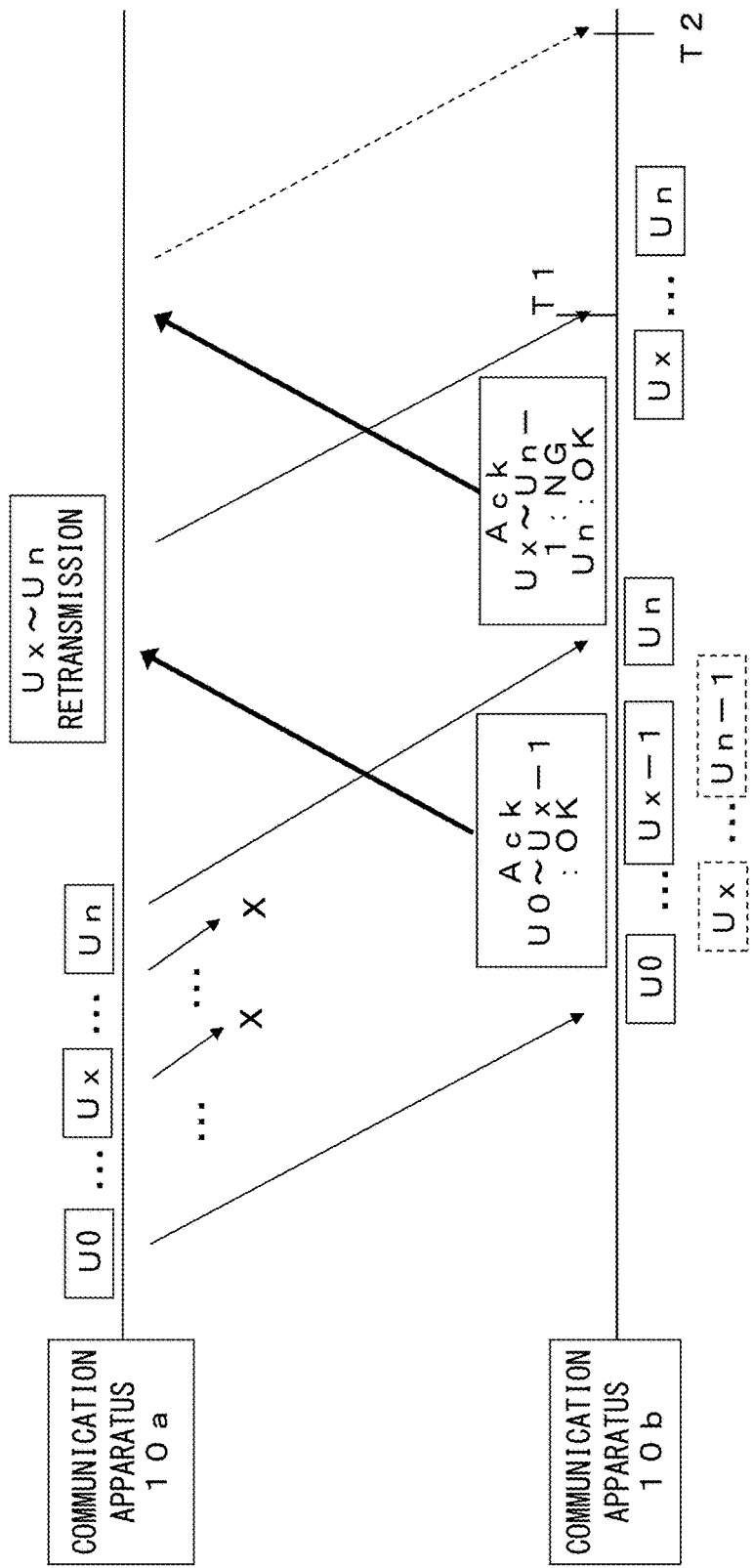
FIG. 15 illustrates an example of packet reception timing.

FIG. 15 illustrates an example of packet reception timing. It is assumed that the communication apparatus 10a transmitted forwarding packets U0-Un to the communication apparatus 10b according to the retransmission-basis transmission method. In addition, it is assumed that a control acknowledgement packet generated when the communication apparatus 10b received a packet Ux−1 was transmitted from the communication apparatus 10b to the communication apparatus 10a. Here, assuming that all the packets U0 through Ux−1 were all received at the communication apparatus 10b, the selecting unit 22a of the communication apparatus 10a determines that Ack is awaited for Ux-Un, and keeps Ux-Un in the transmission table.

Meanwhile, it is assumed that the communication apparatus 10b could not receive Ux through Un−1 but received the packet Un. Then, the communication apparatus 10b generates a control acknowledgment packet for reporting that the packet Un was received but reception of Ux through Un−1 failed, and transmits it to the communication apparatus 10a.

Here, it is assumed that the period in which the communication apparatus 10a does not receive any packets from the terminal 1 exceeds the threshold Th during the period until the packet Un reaches the communication apparatus 10b. Then, the selecting unit 22a requests the retransmission processing unit 15a to perform error correction-basis retransmission of Ux-Un. Accordingly, the communication apparatus 10a retransmits Ux-Un to the communication apparatus 10b on the error correction basis before receiving a control acknowledgement packet for Ux-Un. Therefore, the communication apparatus 10b is able to receive Ux-Un at the time T1. The control acknowledgment packet for Ux-Un reaches the communication apparatus 10a at the time at which the Round Trip Time (RTT) has elapsed from the time at which communication apparatus 10a transmitted Ux-Un. Accordingly, it follows that the communication apparatus 10a has forcibly transmitted, while waiting for the control acknowledgment packet, packets for which Ack from the communication apparatus 10b is awaited and for which the first transmission failed, before the RTT of the first packet elapses. Therefore, in the communication using the communication apparatus 10, delay due to the expansion of length of the RTT is less prone to occur because forced retransmission of packets may be performed regardless of the RTT.

For example, as illustrated in FIG. 15, in the case in which Ux through Un−1 are retransmitted after waiting for the second control acknowledgment packet from the communication apparatus 10b, the time at which the communication apparatus 10b receives Ux through Un−1 is delayed to the time T2. Therefore, using the communication method according to the embodiment, the communication delay that occurs between the communication apparatus 10a and the communication apparatus 10b may be shortened by the period corresponding to T2-T1. Furthermore, the error correction-basis retransmission is performed when it is expected that there is a prescribed or larger available space in the line between the communication apparatus 10a and the communication apparatus 10b. Therefore, it becomes possible to prevent deterioration in the throughput due to the transmission of redundant packets.

For example, the throughput and the latency according to the transmission methods are compared in the case in which the bandwidth between the communication apparatus 10a and the communication apparatus 10b is M (bps), the redundancy according to FEC is A, the RTT between the communication apparatus 10a and the communication apparatus 10b is r(sec), and the packet loss rate is d. Meanwhile, it is assumed that the redundancy A is about 0.1, and the packet loss rate d is a value of about 0.1-0.2.

When forwarding and retransmission of all the packets are performed on the retransmission basis, the throughput is Mbps. However, the expected value of the latency is $(r/2) \times (1-d)+(r/2+r) \times d$. When forwarding of all the packet is performed with FEC, the throughput is $M/(1+A)$bps, but the expected value of the latency is $(r/2)$.

Meanwhile, when packets are forwarded according to a combination of retransmission-basis forwarding and error correction-basis retransmission by performing the forwarding process using the communication apparatus 10, the expected value of the throughput is Mbps, and the expected value of the latency is $(r/2)$. Therefore, by performing retransmission-basis forwarding and error correction-basis retransmission using the communication apparatus 10, it becomes possible to suppress delay due to retransmission, without reducing the throughput.

Second Embodiment

In the first embodiment, an explanation is provided for an example of a case in which the threshold Th is shorter than the Round Trip Time (RTT) between the communication apparatus 10a and the communication apparatus 10b, but there is also a case in which the calculated value of the threshold Th exceeds the RTT. In this case, the communication apparatus 10a is able to forcibly retransmit packets for which the receiving state at the communication apparatus 10 at the receiving side has not been confirmed before the RTT between the transmitting side and the communication apparatus 10 at the receiving side elapses, by dividing the retransmission process for packets for which success of transmission has not been confirmed into multiple times.

In the second embodiment, it is assumed that the measurement unit 21 is also able to measure the time needed for the communication between the communication apparatus 10a and the communication apparatus 10b using the measurement packet. The measurement unit 21a generates a first measurement packet and memorizes the time at which the first measurement packet was transmitted from the transmitter 11a to the communication apparatus 10b. The first measurement packet is received at the receiver 12b of the communication apparatus 10b and it is output to the measurement unit 21b. Meanwhile, it is assumed that the receiver 12b has stored the format of the measurement packet in advance and is able to identify other packets and the measurement packet. The measurement unit 21b generates a second measurement packet that responds to the first measurement packet and transmits it to the communication apparatus 10a via the transmitter 11b. Upon receiving the second measurement packet, the receiver 12a of the communication apparatus 10a outputs the second measurement packet to the measurement unit 21a. The measurement unit 21a obtains the time at which the second measurement packet was received and calculates the difference from the transmission time of the first measurement packet. The measurement unit 21a outputs the obtained difference to the threshold calculating unit 23a as the RTT.

The threshold calculating unit 23a compares the values of the threshold Th and the RTT. When the threshold Th is equal to or larger than the RTT, the threshold calculating unit 23a calculates a threshold Thk instead of the threshold Th. When the threshold Thk is calculated, the threshold Thk is used instead of the threshold Th in determining whether or not to perform the error correction-basis retransmission process. The threshold Thk is calculated according to the following formula.

$$Thk = Y \times A/(B-B_{used}) = X \times A/K(B-B_{used}) = Th/K$$

Here, Y=X/K. Y is the byte count of data to be transmitted in one error correction-basis retransmission process. K is the number of retransmission processes performed on the error correction basis. In addition, X is the byte count of the total amount of data to be retransmitted, and A is the ratio of the amount of data included in the packet as the redundant portion transmitted for performing error correction-basis retransmission to the total amount of data to be retransmitted. $(B-B_{used})$ is the bandwidth of the available band that is not used for the communication between the communication apparatus 10a and the communication apparatus 10b.

The threshold calculating unit 23a may determine the number of retransmission processes according to the value of the threshold Th. For example, the threshold calculating unit 23a may make the value of K larger for the longer threshold Th, and may set an arbitrary integer that is 2 or larger as K. By dividing the error correction-basis retransmission process into multiple times as described above, the communication apparatus 10 is able to forcibly retransmit packets for which Ack has not been received before the RTT elapses, even when the data amount of the redundant portion transmitted in the retransmission process is large. Accordingly, delay in communication may be suppressed even when the RTT becomes longer as the distance between the communication apparatus 10 at the transmitting side and the communication apparatus 10 at the receiving side becomes longer.

Furthermore, in the second embodiment, the data amount transmitted in one retransmission process is smaller, and therefore, the amount of redundant packets used for one retransmission process may also be suppressed. Accordingly, it becomes easier to avoid a situation in which the throughput deteriorates more than expected due to the error correction-basis retransmission.

As described above, in the communication method according to the embodiments, delay may be suppressed while preventing deterioration in the throughput.

Others

Meanwhile, the embodiments are not limited to the ones described above, and may be modified in various ways. Hereinafter, some examples are described.

In the embodiments described above, in order to make it easier to see the drawings, explanations are provided for an example of a case in which the sequence number in the TCP header and the sequence ID in the data header are the same, but they may also be different. The TCP header is a sequence number defined between apparatuses that perform communication using TCP, while the sequence ID is counted up from 0 for each connection. Therefore, for example, assuming that the sequence numbers of packets transmitted from the terminal 1 to the communication apparatus 10a start from 100, it follows that data included in the TCP packet of the sequence number 100 are included in the forwarding packet of the sequence ID=0.

In the embodiments described above, explanations are provided for an example in which the transmission table is a hash table, but the transmission table may also be a table that records the transmission state of each packet and the reception state of Ack while associating them with the sequence ID. A variation example of the transmission table is illustrated in FIG. 16. In the example in FIG. 16, the transmitting flag=0 indicates that transmission has been done, and the transmitting flag=1 indicates that Ack has not been obtained after transmission. Ack represents the reception state of the control acknowledgement packet. Therefore, a packet with the transmitting flag=0 and the Ack reception state=received represents a packet for which a control acknowledgement packet that includes Ack that indicates the success of the packet has been received after the transmission of the packet. A packet with the transmitting flag=1 and the Ack reception state=awaiting reception represents a packet for which a control acknowledgment packet that includes Ack that indicates the result of the transmission has not been received after the transmission of the packet. In addition, a packet for which the transmission flag=1 and the Ack reception state=received represents a packet for which a control acknowledgment that includes information that indicates failure of the transmission of the packet has been received after the transmission of the packet. Therefore, FIG. 16 is a transmission table in a case in which transmission of the packets of the sequence IDs 8020-8023, 8700, and 9010-9021 failed, and for the packets whose sequence IDs are 10000-19999, the control acknowledgement packet has not been received.

FIG. 17 illustrates an example of a network. The communication apparatus 10 may be used in a network in which three or more communication apparatuses 10 are included, as illustrated in FIG. 17. In this case, a threshold Thd is used for the determination at the selecting unit 22. The threshold Thd is obtained by the following formula.

$$Thd = X \times A / Z$$

Here, Z is a value obtained by subtracting the sum of the bands used for the communication from the bandwidth and dividing it by the number of communication apparatuses 10 that may communicate with the communication apparatus 10 of the transmission source. In addition, X is the byte count of the data to be retransmitted, and A is the redundancy added by error correction.

For example, in the example of FIG. 17, communication apparatuses 10a-10c are in the network, and therefore, the line connected to the communication apparatus 10a may be used for both the communication between the communication apparatus 10a and the communication apparatus 10b and the communication between the communication apparatus 10a and the communication apparatus 10c. Therefore, a value obtained by subtracting the bandwidth used for the communication between the communication apparatus 10a and the communication apparatus 10b and the bandwidth used for the communication between the communication apparatus 10a and the communication apparatus 10c from the bandwidth of the line connected to the communication apparatus 10a and dividing it by 2 is used as Z. By changing the threshold used by the selecting unit 22 as described above, it becomes possible to perform communication in which the two types of transmission methods, the retransmission-basis and the error correction-basis, are combined, in a network in which two or a larger arbitrary number of communication apparatuses 10 are included.

Furthermore, the measurement method for the RTT may be changed according to the implementation. In the second embodiment, an explanation is provided for an example in which whether or not to perform retransmission is determined using the threshold value Thk when the threshold Th is equal to or larger than RTT, and 1/K of packets selected as the retransmission target are retransmitted in one transmission process, but the same process may also be performed when the threshold Th is shorter than the RTT.

In addition, in the examples described above, explanations are provided for examples in which TCP and UDP are used, but the protocol used for communication may be changed according to the implementation. Furthermore, error correction other than FEC may also be used in the error correction-basis retransmission.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication method, in a network including a first communication apparatus, a second communication apparatus, and a third communication apparatus, executed by the second communication apparatus, comprising:
   identifying, from packets received from the first communication apparatus, forwarding packets that are packets to be forwarded to the third communication apparatus;

measuring an interval in receiving the forwarding packets from the first communication apparatus;

forwarding the forwarding packets to the third communication apparatus;

receiving report information that reports a reception state of the forwarding packets from the third communication apparatus;

using the report information to select target packets that are packets for which success of reception has not been reported from the third communication apparatus in the packets that were forwarded to the third communication apparatus; and when the interval in receiving the forwarding packets from the first communication apparatus exceeds a threshold, retransmitting the target packets to the third communication apparatus in a format using Forward Error Correction (FEC) coding.

2. The communication method according to claim 1, wherein
the target packets include packets for which the reception state has not been reported from the third communication apparatus and packets for which failure of reception of the packets has been reported from the third communication apparatus.

3. The communication method according to claim 1, wherein the second communication apparatus further performs a process comprising calculating the threshold as a time needed for the second communication apparatus to transmit, to the third communication apparatus, data of a redundant portion used for transmitting the target packets in the format using Forward Error Correction (FEC) coding using an unused bandwidth in a line between the second communication apparatus and the third communication apparatus.

4. The communication method according to claim 3, wherein the second communication apparatus further performs a process comprising:
obtaining a response time that is a time from a first time point at which the second communication apparatus transmitted a first packet to the third communication apparatus until a second time point at which a second packet that is a response for the first packet reaches the second communication apparatus;

determining whether the threshold exceeds the response time;

when the threshold exceeds the response time, calculating a first value such that a quotient obtained by dividing the threshold by the first value becomes shorter than the response time;

obtaining a second value that is a data amount obtained by dividing an amount of the data of a redundant portion used for transmitting the target packets in the format using Forward Error Correction (FEC) coding by the first value;

setting a third value as a length of time needed for the second communication apparatus to transmit, to the third communication apparatus, a data amount of the second value using the unused bandwidth in the line between the second communication apparatus and the third communication apparatus; and when the interval in receiving the forwarding packets from the first communication apparatus exceeds the third value, retransmitting packets included in one group obtained by dividing the target packets into a same number of groups as the first value, to the third communication apparatus in a format using Forward Error Correction (FEC) coding.

5. A communication apparatus comprising:
a receiver configured to receive packets from a terminal; and a processor configured to perform a process including measuring an interval in receiving forwarding packets that are packets forwarded to a communication destination of the terminal, forwarding the forwarding packets to the communication destination, selecting target packets that are packets for which success of reception has not been reported from the communication destination in the packets that were forwarded to the communication destination, and performing, when the interval in reception of the forwarding packets exceeds a threshold, a process for retransmitting the target packets to the communication destination in a format using Forward Error Correction (FEC) coding.

6. The communication apparatus according to claim 5, wherein the processor selects, as the target packets, packets for which the reception state has not been reported from the third communication apparatus and packets for which failure of reception of the packets has been reported from the third communication apparatus.

7. The communication apparatus according to claim 5, wherein
the processor calculates the threshold as a time needed for the communication apparatus to transmit, to the communication destination, data of a redundant portion used for transmitting the target packets in the format using Forward Error Correction (FEC) coding using an unused bandwidth in a line between the communication apparatus and the communication destination.

8. A computer-readable recording medium having stored therein a program for, in a network including a first communication apparatus, a second communication apparatus, and a third communication apparatus, causing the second communication apparatus to execute a process comprising:
identifying, from packets received from the first communication apparatus, forwarding packets that are packets to be forwarded to the third communication apparatus;

measuring an interval in receiving the forwarding packets from the first communication apparatus;

forwarding the forwarding packets to the third communication apparatus;

receiving report information that reports a reception state of the forwarding packets from the third communication apparatus;

using the report information to select target packets that are packets for which success of reception has not been reported from the third communication apparatus in the packets that were forwarded to the third communication apparatus; and when the interval in receiving the forwarding packets from the first communication apparatus exceeds a threshold, retransmitting the target packets to the third communication apparatus in a format using Forward Error Correction (FEC) coding.

9. The computer-readable recording medium according to claim 8, wherein
the target packets include packets for which the reception state has not been reported from the third communication apparatus and packets for which failure of reception of the packets has been reported from the third communication apparatus.

10. The computer-readable recording medium according to claim 8, wherein the program causes the second communication apparatus to further execute a process comprising calculating the threshold as a time needed for the second communication apparatus to transmit, to the third communication apparatus, data of a redundant portion used for transmitting the target packets in the format using Forward Error Correction (FEC) coding using an unused bandwidth in a line between the second communication apparatus and the third communication apparatus.

11. The computer-readable recording medium according to claim 10, wherein the program causes the second communication apparatus to further execute a process comprising:
- obtaining a response time that is a time from a first time point at which the second communication apparatus transmitted a first packet to the third communication apparatus until a second time point at which a second packet that is a response for the first packet reaches the second communication apparatus;
- determining whether the threshold exceeds the response time;
- when the threshold exceeds the response time, calculating a first value such that a quotient obtained by dividing the threshold by the first value becomes shorter than the response time;
- obtaining a second value that is a data amount obtained by dividing an amount of the data of a redundant portion used for transmitting the target packets in the format using Forward Error Correction (FEC) coding by the first value;
- setting a third value as a length of time needed for the second communication apparatus to transmit, to the third communication apparatus, a data amount of the second value using the unused bandwidth in the line between the second communication apparatus and the third communication apparatus; and
- when the interval in receiving the forwarding packets from the first communication apparatus exceeds the third value, retransmitting packets included in one group obtained by dividing the target packets into a same number of groups as the first value, to the third communication apparatus in a format using Forward Error Correction (FEC) coding.

* * * * *